US012811985B2

(12) United States Patent
Bertolotti et al.

(10) Patent No.: US 12,811,985 B2
(45) Date of Patent: Nov. 24, 2026

(54) SYSTEMS AND METHODS FOR SECURE AND TRANSPARENT EXECUTION OF DISTRIBUTED OPERATIONS

(71) Applicant: ModernFi, Inc., New York, NY (US)

(72) Inventors: Paolo Bertolotti, New York, NY (US); Adam DeVita, New York, NY (US)

(73) Assignee: ModernFi, Inc., New York, NY (US)

( * ) Notice: Subject to any disclaimer, the term of this patent is extended or adjusted under 35 U.S.C. 154(b) by 89 days.

(21) Appl. No.: 18/952,729

(22) Filed: Nov. 19, 2024

(65) Prior Publication Data

US 2025/0168222 A1 May 22, 2025

Related U.S. Application Data

(60) Provisional application No. 63/600,930, filed on Nov. 20, 2023, provisional application No. 63/600,927, filed on Nov. 20, 2023, provisional application No. 63/600,946, filed on Nov. 20, 2023.

(51) Int. Cl.
*H04L 9/40* (2022.01)
*G06F 21/60* (2013.01)
*H04L 67/10* (2022.01)

(52) U.S. Cl.
CPC ............ *H04L 63/20* (2013.01); *G06F 21/606* (2013.01); *H04L 67/10* (2013.01)

(58) Field of Classification Search
CPC ........ H04L 63/20; H04L 67/10; G06F 21/606
See application file for complete search history.

(56) References Cited

U.S. PATENT DOCUMENTS

| | | | |
|---|---|---|---|
| 7,640,199 | B1 † | 12/2009 | Hyland |
| 8,260,705 | B1 | 9/2012 | Bent |
| 8,781,931 | B1 | 7/2014 | Bent et al. |
| 10,510,082 | B1 | 12/2019 | Zimmerman |
| 11,138,667 | B2 | 10/2021 | Aber |
| 11,392,920 | B1 | 7/2022 | Calusinski |
| 11,526,859 | B1 | 12/2022 | Cousins |
| 11,610,260 | B1 † | 3/2023 | Bent, II |
| 2008/0120228 | A1 † | 5/2008 | Bent |

(Continued)

*Primary Examiner* — Brian Whipple

(74) *Attorney, Agent, or Firm* — Wolf, Greenfield & Sacks, P.C.

(57) ABSTRACT

An integration system is provided that defines a first network of computer systems and within the first network establishes communication protocols and security requirements. The architecture includes a layered data model, where the architecture and/or model enable improvement over conventional security, data redundancy, and further improves communication/execution efficiency over various conventional systems, approaches, and databases. The first network can be tailored to perform distributed operations on behalf of end-users, and for example, integrate the distributed operations transparently into existing systems, so that the new functionality is seamless and indistinguishable from native data/database operations from the end-user perspective. The data model can be configured to associate layers of the model with respective systems and distribute the operations such that real world analogs for the data are held across many systems (e.g., specific systems in the architecture).

20 Claims, 18 Drawing Sheets

(56) References Cited

U.S. PATENT DOCUMENTS

| | | | | |
|---|---|---|---|---|
| 2013/0159152 | A1 * | 6/2013 | Minor .................... | G06Q 40/10 705/30 |
| 2018/0212999 | A1 | 7/2018 | Kassimis | |
| 2022/0005115 | A1 * | 1/2022 | San Martin ............. | G06F 9/451 |
| 2022/0044315 | A1 | 2/2022 | Kothapalli | |
| 2022/0248226 | A1 | 8/2022 | Smith | |
| 2024/0112271 | A1 | 4/2024 | Romney | |
| 2025/0168200 | A1 | 5/2025 | Bertolotti et al. | |

* cited by examiner
† cited by third party

SYSTEMS AND METHODS FOR SECURE AND TRANSPARENT EXECUTION OF DISTRIBUTED OPERATIONS

RELATED APPLICATIONS

This application claims priority under 35 U.S.C. § 119(e) to U.S. Provisional Application Ser. No. 63/600,927, entitled "SYSTEMS AND METHOD FOR TRANSPARENT EXECUTION OF DISTRIBUTED OPERATIONS," filed on Nov. 20, 2023. This application claims priority under 35 U.S.C. § 119(e) to U.S. Provisional Application Ser. No. 63/600,930, entitled "SYSTEMS AND METHOD FOR TRANSPARENT EXECUTION OF DISTRIBUTED OPERATIONS," filed on Nov. 20, 2023. This application claims priority under 35 U.S.C. § 119(e) to U.S. Provisional Application Ser. No. 63/600,946, entitled "SYSTEMS AND METHOD FOR TRANSPARENT EXECUTION OF DISTRIBUTED OPERATIONS," filed on Nov. 20, 2023. Each of which applications are herein incorporated by reference in their entirety.

BACKGROUND

Various systems and architectures support transactional services in a variety of settings. Notably, regulations and rules requirements can prevent adoption or integration of newer services. Further, old computer systems and architectures can inhibit fully leveraging newer practices and functionality. The banking industry provides an example where old systems, architectures, and practices prevent the adoption and efficient operation and new approaches.

SUMMARY

The inventors have realized that conventional systems and approaches have left significant technical gaps that can be addressed, for example, by updating the architecture and systems that support operations. According to some embodiments, an integration system is configured to define a first network of computer systems (e.g., support systems) and within the network establish communication protocols and security requirements. In various embodiments, the architecture can improve over conventional security, data redundancy, and improve communication/execution efficiency over various conventional systems and approaches. According to some embodiments, the first network is tailored to perform distributed operations on behalf of end-users, and for example, integrate the distributed operations transparently into existing digital banking systems ("DBS"), so that the new functionality is seamless and indistinguishable from native DBS operations from the end-user perspective.

According to some embodiments, the first network can include secured communication endpoints that enable integration into existing architectures, or provide holistic functionality that includes distributed operation in other settings. One or more secure communication endpoints can mediate access to and use of the first network architecture. The communication endpoint can be accessed via application programming interfaces ("API"), defined software development kits, webhooks, remote procedure calls, web-interface, and/or other protocols. In various embodiments, an API can be integrated into an existing platform and access distributed operation from the environment of the existing platform, while distributed operations are executed and managed via the first network architecture. The operations can be executed transparently from the perspective of the existing system or any external system.

In further embodiments, integration with an existing platform can include generation and display of user interface objects that link to the first network and trigger distributed operations on the respective systems. The user interface objects are configured to display multiple levels of information associated with the distributed operations. The first level is configured to provide aggregate information associated with the distributed operations. For example, the integration with the existing platform can be configured to provide sweep account access to a traditional DBS or platform, where instead of traditional accounts, the user can interact with an aggregate account via the first network that links into any number of systems/banks in the first network. By triggering operations on the sweep account, the user is providing an aggregate amount to the first network architecture, that is then transformed into distributed operations on respective systems within the first network and associated record that can be determined when the distributed operation is triggered. The user interface object can also access the information associated with the detailed execution of the distributed operation, for example, in response to selection of "more detail" in the user interface object or other visual indicator that reflects additional information is available (e.g., "+," "more," "details," among other options).

According to one aspect, a system is provided. The system comprises at least one processor and configured to define a first network of computer systems, having associated communication protocols, and respective security requirements for managing communication between the computer systems in the first network; (e.g., member system of respective participants and execution manager), wherein the first network of computer systems includes at least one execution manager and a plurality of receiver systems, establish security definitions (e.g., comm. protocol, signatures, etc.) in response to integrating any computer system to the first network to secure communication and define secure operation within the first network, define a distributed architecture comprising at least some of the systems of the first network (e.g., sweep system, custodian system, and receiving systems) to manage secure distributed operations, establish an aggregation point within the distributed architecture of the first network maintained by the at least one execution manager, integrate a first communication endpoint (e.g., API, web-interface, webhook, etc.) into the first network architecture, the first communication endpoint configured to manage external communication requests having associated functions (e.g., external to the first network), and transform the external communication request and associated functions into the secure distributed operations for execution on respective members of the distributed architecture (e.g., execution manager, sweep system, custodian system, and receiver systems).

According to one embodiment, the distributed operation is managed by the at least one execution manager. According to one embodiment, the at least one execution manager is configured to define a distributed set of operations for execution by the members of the distributed architecture. According to one embodiment, the at least one execution manager is configured to define respective ones of the set of operations for execution as aggregations of individual data requests on omnibus record values. According to one embodiment, the at least one execution manager is configured to record and maintain records for individual data requests.

According to one embodiment, the at least one processor is configured to update the distributed database responsive to execution of the distributed operation. According to one embodiment, the at least one execution manager is configured to return an acknowledgement or results of the execution of the distributed operation to the source of the external communication request.

According to one embodiment, the at least one execution manager is configured to host at least a portion of the first communication endpoint. According to one embodiment, the at least one execution manager is configured to consolidate over a defined time period a plurality of single function operations received from external communication requests for a plurality of clients, and determine at least one aggregate operation based on the consolidation of the single function operations, and communicate a respective aggregate operation to at least some of the members of the distributed architecture associated with generating a final output for the at least one aggregation operation. According to one embodiment, the at least one processor is configured to enhance a pre-existing digital banking system (DBS) by mapping operations of the pre-existing DBS into distributed operations executed on the distributed architecture. According to one embodiment, the mapping is managed by the at least one execution manager.

According to one embodiment, the system further comprises a second communication endpoint configured to integrate into external systems and manage secure communication with the first communication endpoint. According to one embodiment, the second communication endpoint is configured to process native operations requested in a pre-existing DBS into secure communication requests to the distributed architecture via the first communication endpoint. According to one embodiment, the first communication endpoint is configured to map native operations received from the pre-existing DBS to an initial number of member systems on the first network. According to one embodiment, the initial number of member systems is dynamically determined in response to a respective request. According to one embodiment, the initial number of member systems is dynamically determined based on threshold value assignments or distribution rules. (e.g., <250 K/per institution per client or modified by best rates, etc.).

According to one embodiment, the at least one processor is configured to monitor a status of a client account in response to executing operations and identify any operation that results in exceeding the threshold value assignments or the distribution rules. According to one embodiment, the at least one processor is configured to update required participants according to the number of members of the first network. According to one embodiment, the first network of computer systems includes the at least one execution manager, and at least one sweep system, at least one custodian system, and a plurality of receiver systems.

According to one aspect, a distributed architecture system is provided. The system comprises at least one processor operatively connected to a memory, the at least one processor when executing configured to define and manage a distributed architecture including an execution manager, the execution manager configured to accept respective requests comprising respective single operations from a plurality of clients for transformation into respective distributed operations generate individual level records for respective ones of the plurality of clients in a first layer of data based on the single operations, and generate aggregate client information across the plurality of clients in the first layer of data based on a net result of the single operations, define and manage a second layer of data for the distributed architecture comprising a second aggregate record level associated with a custodian system configured to aggregate distribution of operations throughout the distributed architecture, define and manage a third layer of data for the distributed architecture comprising a third aggregate record level associated with a plurality of receiver systems, and execute a distribution of individual level records across the distributed network according to a threshold holding level reflected in each data level and each participant of the distributed architecture.

According to one embodiment, the at least one processor is configured to define and manage a fourth layer of data for the distributed architecture comprising a first aggregate record level associated with a sweep system. According to one embodiment, the sweep system is configured to accept initial transfers from external systems to start participation in distributed functionality. According to one embodiment, the execution manager is configured to accumulate the respective requests comprising respective single operations from the plurality of clients over a first time period, and aggregate changes within respective data layers. According to one embodiment, the execution manager is configured to generate instructions to effect the aggregate changes within the respective data layers. According to one embodiment, the execution manager is configured to optimize execution of the distributed operation to minimize a number of operations required.

According to one embodiment, the execution manager is configured to optimize execution of the distributed operation to minimize a number of systems required to execute the aggregate changes on the distributed architecture. According to one embodiment, the third layer of data for the distributed architecture comprising the third aggregate record level associated with the plurality of receiver systems includes a sweep system and the custodian system. According to one embodiment, the custodian system is configured to aggregate the distribution of operations throughout the distributed architecture in response to instruction received from the execution manager.

According to one aspect, a distributed data management system is provided. The system comprising at least one processor operatively connected to a memory, the at least one processor when executing configured to instantiate a logical integration layer, the integration layer configured to provide a secure communication channel between a first digital banking subsystem ("DBS") and a first network of systems, accept a plurality of requests (e.g., deposit, withdraw, transfer, etc.) in a native format of the first DBS, map the plurality of requests having a distributed operation target or distributed operation source into a plurality of corresponding distributed operations on the first network, manage communication of aggregated results of respective ones of the plurality of distributed operations for display by a first visual object in the DBS, and enable access to detailed distribution information reflecting detailed properties of the aggregated results via the first visual object.

According to one embodiment, the native format of the DBS comprises a non-distributed format. According to one embodiment, the non-distributed format includes specification of a single operation source and single operation target. According to one embodiment, the distributed operation target or the distributed operation source includes a sweep account.

According to one aspect, a distributed data management system, comprising at least one processor operatively connected to a memory, the at least one processor when executing configured to extend an existing digital banking subsystem ("DBS") having native operations to include distributed operation, the distributed operation executed in response to accepting native formatted operation requests from the DBS having a distributed operation target or source, mapping at least some of the accepted native formatted operation requests from the DBS to a first network, the first network comprising a distributed architecture including an execution manager, the execution manager configured to accept and transform respective native requests into respective distributed operations, generate individual client level records based on the native formatted operation requests, and generate aggregate information for a plurality of clients based on aggregating net results of the native formatted operation requests, and a first visual object associated with the DBS, configured to display aggregate, individual, and participant level information associated with the execution or results of the distributed operation.

According to one embodiment, the non-distributed native operations (e.g., transfer, withdrawal, deposit, etc.) operate on accounts available through the DBS. According to one embodiment, the first visual object is configured to accept client requests according to a format defined by native request visualization and operation for non-distributed operation. According to one embodiment, the first visual object is configured to display distributed operation functionality in conjunction with non-distributed functionality.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
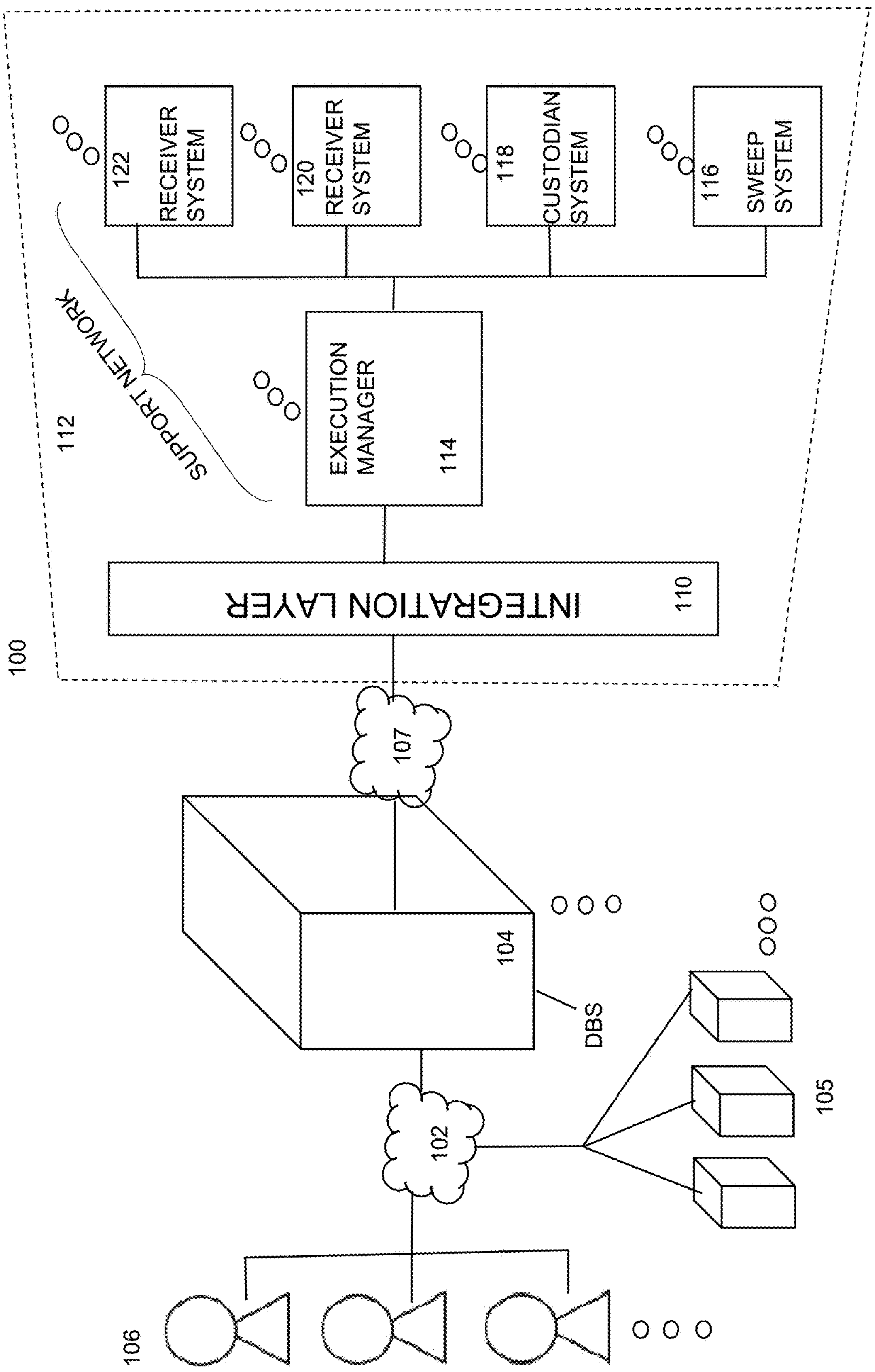
FIG. 1 is a block diagram of an example integration system, according to one embodiment.

According to various embodiments, an integration system is configured to define a first network of computer systems (e.g., integration support systems) and within the network establish communication protocols and security requirements. According to some embodiments, the first network is tailored to enable distributed operations on behalf of end-users, and for example, integrate the distributed operations transparently into existing DBS, so that new functionality is seamless and indistinguishable from native DBS operations from the end-user perspective. The first network can include endpoints that enable integration into existing architectures, or provide holistic functionality that includes distributed operation in other settings.

In further embodiments, integration with an existing platform can include generation and display of user interface objects that are linked to the first network and trigger distributed operations on the respective systems of the first network. For example, the integration with the existing platform can be configured to provide sweep account functionality to a traditional DBS or platform, where instead of traditional accounts, the user can interact with an aggregate account that links into any number of systems in the first network.

The architecture and integration enable the system to provide distributed operation functionality in the context of extending an existing system that provides non-distributed functions. Various embodiments are configured to preserve the appearance and ease of use of non-distributed (e.g., native) operation, and thus enhance the functionality of such conventional implementation. In various embodiments, the first network can include an execution manager configured to manage distribution of operation across members of the first network, allocate system(s) to participate in the distributed operation(s), record and track the results of the individual and aggregate operations on the member systems. In the DBS context, the execution manager is configured to track individual user records (e.g., depositor accounts), operation requests, and resulting amounts upon execution. The execution manager is also configured to allocate distributed operations between the members of the first network (e.g., sweep systems, custodian systems, and receiver systems).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is an example block diagram of an integration system 100 coupled with a pre-existing DBS 102. The DBS can be connected to any number of banks/systems (e.g., 105) that host records for their respective clients (e.g., users 106). Alternatively, any custodian can also operate its own DBS and provide access to any users (e.g., 106) via a network connection 107, including for example, the internet.

According to one embodiment, the DBS (e.g., 104) is configured to provide conventional services to the various end users (e.g., 106). Such conventional services include the ability to view balances, transfer money, etc. Generally speaking, such conventional services involve operations performed on users accounts directly, but do not provide for distributed operation. According to one embodiment, the integration system 100 can extend the functionality associated with any DBS based on connecting the existing DBS system to the integration system. According to one embodiment, the integration system 100 connects to the DBS 104 via a conventional network (e.g., 107) and a communication endpoint.

Shown in FIG. 1 is an integration layer (e.g., 110) that includes the communication pathway between the DBS and integration system. The integration layer 110 can be configured to communicate with any number of DBSs (represented by the three dots). In various examples, the integration layer 110 includes any one or more of APIs, web interface, web hook, VPN, secure RPC, among other communication options. According to one embodiment, as long as the communication pathway between the integration system/integration layer and the DBS is secure the integration system can provide extended functionality and access to a support network 112 for performing distributed operation.

As shown in FIG. 1, a dashed line illustrates a logical organization of the integration system 100. The elements of the integration system are also illustrated via blocks of the block diagram and described with associated functionality. In other embodiments, the various functions described can be performed by different members of the integration system, and/or distributed amongst the members of the integration system. In still other embodiments, entities (e.g., 105) supported by a DBS can be participants in the support network, and operate as sweep systems, custodian systems, and/or receiver systems (e.g., 116-122).

According to one embodiment, an execution manager is configured to receive external requests originating from, for example a DBS (e.g., 104). The execution manager 114 is configured to transform the request into a distributed operation. The transformation can include identifying a minimum number of participants from the support network 112 to service a given request. In the DBS context, and more specifically, a sweep account service, the execution manager 112 enables a single interaction with the DBS by an end user to achieve distributed functionality unavailable without the integration system 100. For example, the support network 112 is configured to provide and enable distributed (e.g., sweep) operations across a plurality of computer systems including a sweep system 116, a custodian system 118, and multiple receiver systems 120-122. As the support network 112 and associated architecture is already established, adding clients, and extending the functionality of for example a DBS can be accomplished via minimal interaction with an end user. For example, the execution manager 112 can have already established any required communication protocols, security settings, and set up the requisite architecture so that given an external request from a DBS to access sweep functionality, a single account can be created within the sweep system based on a single agreement to allow the sweep system to operate as an authorized representative of the new client.

According to various embodiments, reducing the operations required to create a new account to a single set of permissions improves operation of conventional approaches and reduces the computational burden required to define the specific relationships, establish permissions on respective systems, and execute a new account creation that includes multiple participants and systems. In addition to the improved operation discussed, the extension of a DBS to include distributed operation and, for example, sweep account services allows the extension manager 112 to improve system security and information security for any client over conventional implementation. For example, the execution manager 112 is configured to maintain deposit or client level records, while managing omnibus or aggregate records at the respective participants in the support network. In this architecture, clients receive the advantage of having their records distributed across a number of different computer systems, while at the same time their individual records are obscured based on aggregating individual information at any of the other respective participants in the support network. The system provides further advantages in the context of the regulatory setting. By distributing client records across the member systems, the integration system leverages and maximizes the application of regulatory safety nets to the respective clients, even where their records are maintained in aggregate form. Thus, the integration system provides and improves measures to protect the client against loss. As is known in the industry, federal regulation typically covers up to a threshold amount in any given account at any given account provider. The integration system can be configured to distribute any amounts received into a plurality of accounts until any individual holding falls within the threshold amount secured by federal regulation. As part of transformation into a distributed operation, embodiments of the integration system are configured to determine the number of participants to include protection regulation. Further embodiments can monitor the effect of any changes to client records and applicable thresholds, increasing or decreasing the number of participants based on applicable thresholds.

According to some embodiments, the integration system is configured to transform a conventional account open process and/or display on the DBS into a distributed operation that is managed through a plurality of systems on the support network 112. As discussed, the execution manager 114 can be configured to receive external requests (e.g., via the integration layer) and transform them into distributed operation on the support network 112. This allows the execution manager 114 to structure sweep accounts to leverage federal regulation and accommodate any value in a client record desired by a user, by distributing to any number of required systems on the support network 112.

According to one embodiment, the support network 112 can include one or more sweep systems (e.g., 116) which are configured to host an omnibus account of aggregated records. The support network 112 can also include one or more custodian systems (e.g., 118). The custodian systems are configured to operate as an aggregation and worker system, having the responsibility to manage actual execution and/or movement of assets in the first network and/or from external accounts. In one example, the execution manager 114 is configured to maintain individual record information (e.g., individual deposit level information) on a per client/user basis. The execution manager 114 is configured to generate aggregations of those records, establish an omnibus sweep account on a sweep system that can be used to accept the aggregate amount and movement between respective participants in the support network, and manage distribution of the individual level records to ensure coverage by federal regulation of an entire record amount. According to various embodiments, receiver systems 120-122 are configured to be the ultimate holders of the deposit level values for a client. The receiver system(s) likewise hold aggregate amounts enabling the system to more efficiently resolve/process movement between the individual client participants. In some embodiments, the system optimizes utilization of the support network by having one or more sweep systems 116 and one or more custodian system 118 also operate as receiver systems so that the total number of members/receiver systems required can be reduced by having the sweep and custodian systems perform dual roles.

Stated more generally, the integration system and associated architecture allows any DBS to include sweep account functionality (e.g., distributed operation), where the sweep account functionality leverages a plurality of computer systems and distributes assets across the plurality of systems until each individual holding by each individual system meets the threshold established by federal regulation on a client by client basis. The integration system can be configured to do this via a more efficient architecture that improves operations (e.g., reduces computational burden, reduces intra-network communication, etc.) and enables the network to operate on obscured information (e.g., via aggregation). In further embodiments, the integration system is configured to monitor records under management and dynamically allocate those assets to additional member systems where any threshold may be exceeded. In other embodiments, the integration system is configured to monitor assets under management and consolidate or eliminate members from participation to reduce the operational burden on the system as a whole, where threshold requirements can be maintained with fewer systems.

According to another aspect, the complexity associated with the distributed computer architecture and interactions between those systems can be eliminated by the logical integration layer/integration system. In further example, communication endpoints can be used to seamlessly manage interactions between existing systems that operate in the context of single user records and respective functions for single user accounts and fully distributed operations. Further aspects, provide the advantage of distributed operation while preserving the native appearance of non-distributed operation from the perspective of end users. Stated generally, a DBS user can access a user interface and have native user interface displays that integrate and trigger the distributed operations of the integration system. From the perspective of these users, there is no difference between requesting conventional operations on their DBS and requesting that distributed operations be executed via the integration system.

Figure 2:
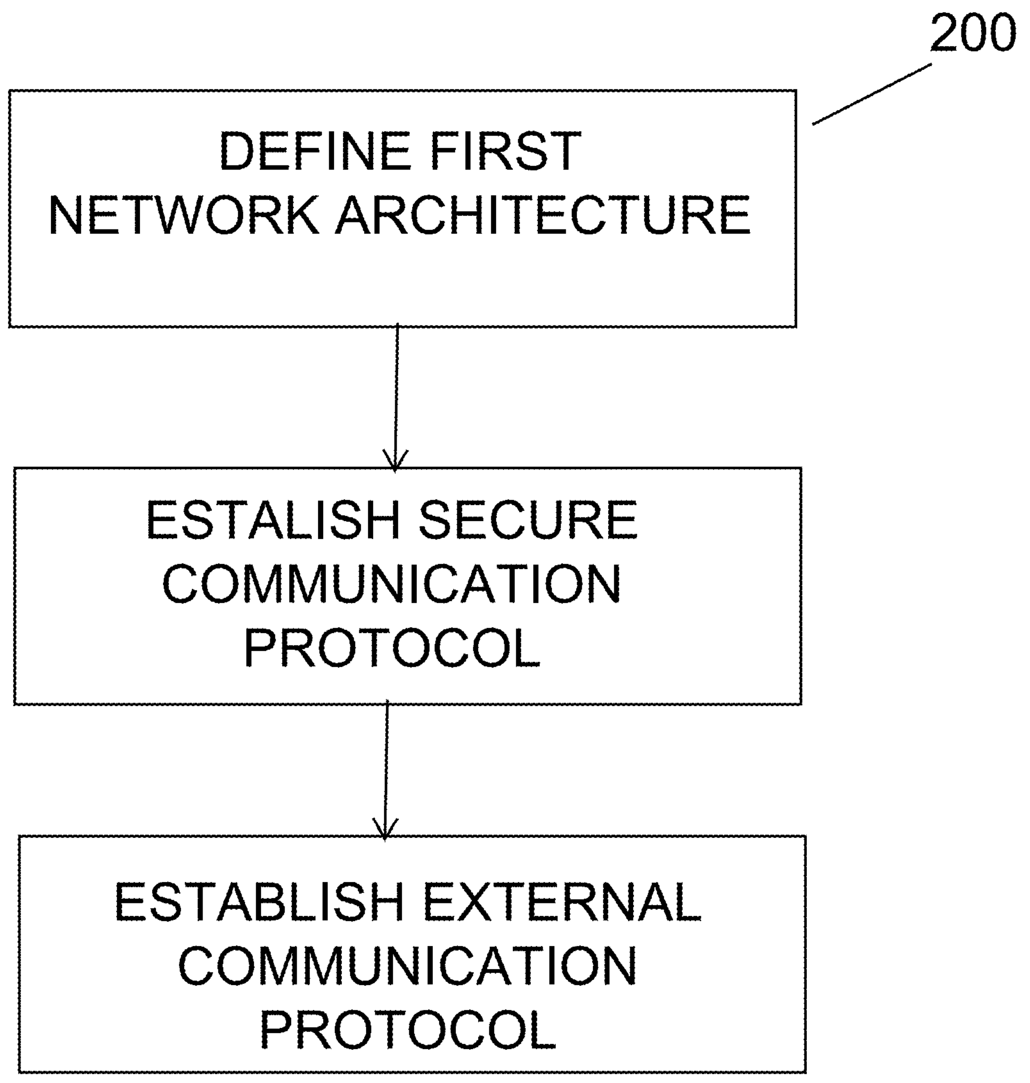
FIG. 2 is an example process flow, according to one embodiment.

FIG. 2 illustrates an example process 200 for establishing a first network to support distributed operation. As shown, process 200 begins at 202 with defining the first network architecture. Members of the network can be identified, for example, based on the corresponding computer system, and roles for each of the participants defined. For example, system roles include execution manager, sweep system, custodian system, and receiver systems. As discussed, members of the first network can be assigned multiple roles in the network. In further embodiments, the functions described for any one of the roles can be distributed amongst the members of the first network. For example, transformation of an external request into a distributed operation may be performed by a system with the execution manager role. In another example, the execution manager functionality can be executed by various systems that make up the first network. Similarly, operations performed by the sweep system and/or custodian system can be distributed. Although functionality may be distributed, in some embodiments, maintenance of individual level records is restricted to improve information security.

Returning to FIG. 2, at 204 the network members establish secure communication pathways, and may also define options to add additional systems. Generally, a large number of participant networks are defined to ensure that individual clients can participate at any desired level while still leveraging regulatory structures. In some examples this can include upwards of 50, 100, or more member systems having a receiver role. Process 200 continues at 206 with defining an external communication protocol, and for example instantiating a least one external facing communication endpoint. The communication endpoint is configured to define the integration system side of a communication pathway, and configured to communicate with a communication endpoint on a DBS. In various embodiments, the process 200 can include communicating defined communication endpoints as distributable digital objects that can be executed on a DBS computer to establish the communication pathway. In other examples, the communication endpoint has defined communication properties and/or permissions that enable a DBS system to configure a communication pathway from the DBS system to the first network seamlessly using native communication capability (e.g., VPN, API, SDK, etc.).

Figure 3:
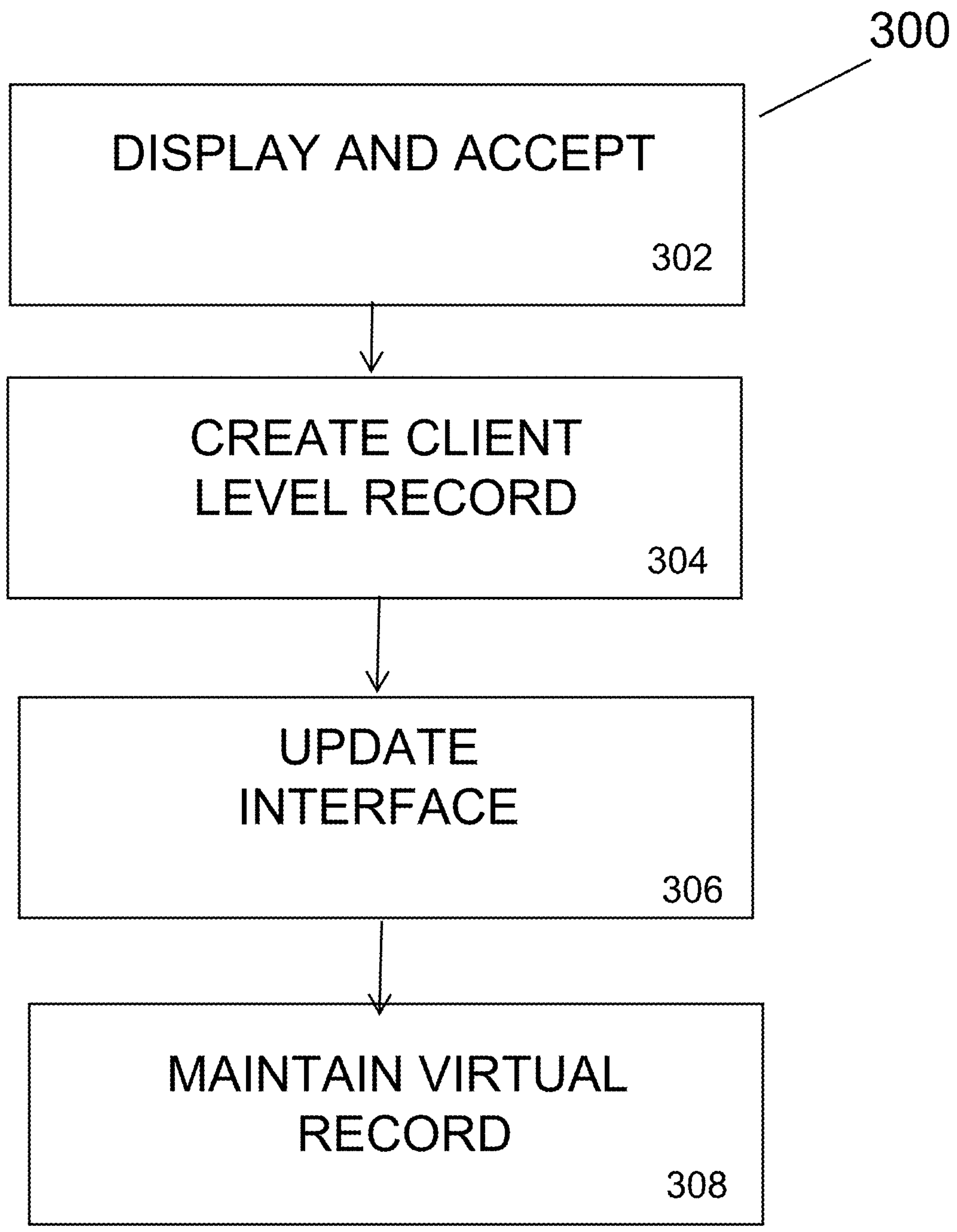
FIG. 3 is an example process flow, according to one embodiment.

FIG. 3 illustrates a process flow for enabling a client/user of a DBS to add distributed functionality to their existing records at the DBS. At 302, a user can be shown an option to add distributed operation accounts to their existing accounts on a DBS. For example, a user can be shown a conventional display of existing accounts, and conventional functionality associated with the same. By selecting the distributed account open in the user interface, the user can begin using the distributed operation functionality, for example, provided by an integration system. As part of the user interface displays, the user must accept terms and conditions associated with the distributed operation. The terms explain that the first network members hold funds for the user as their representative and leveraging the efficiencies of the aggregate record architecture. Once the user has accepted the terms, at 304 a client level record can be created, for example, by an integration system. In various embodiments, the client level record is maintained by an execution manager system. The client level record can be defined as a sub-ledger record in an omnibus/aggregate account, for example, established on a sweep system.

Once the underlying records are created, the user is shown a new user interface object reflecting the ability to trigger distributed operation in the context of their existing DBS system. For example, the user can now with single selections in the user interface transfer value from an existing account to the distributed architecture/functionality. Prior to any action via the user interface, process 300 can end with maintaining a virtualized account at 308. Optionally, processing 300 can include a request to fund the virtual account and resulting in determination of the specifics of a distributed operation that will be executed (e.g., how many first network participants, values to assign to various aggregate accounts, etc.), discussed in greater detail below.

Figure 4:
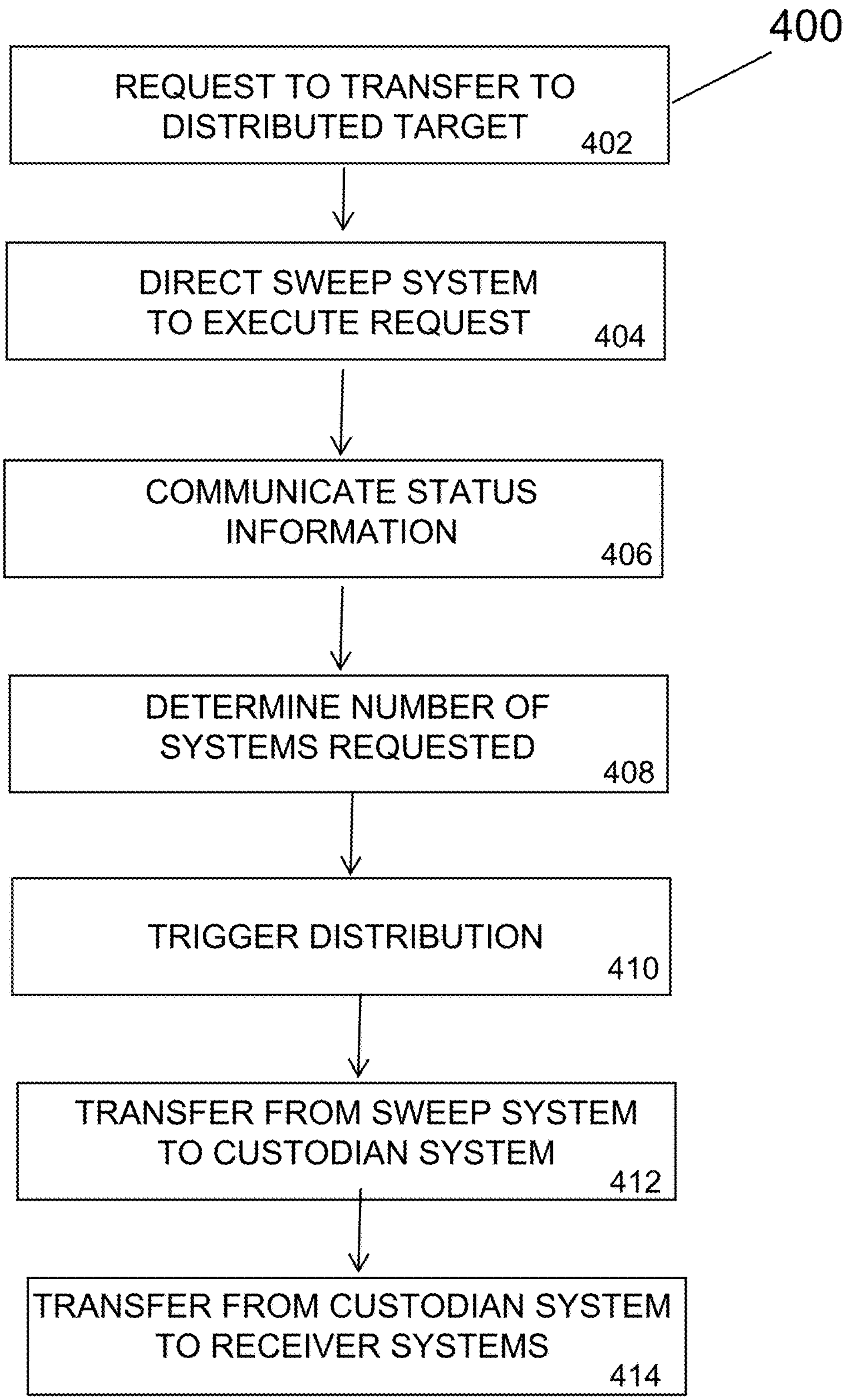
FIG. 4 is an example process flow, according to one embodiment.

FIG. 4 illustrates an example process flow 400 for executing a distributed operation in response to a user request. Process flow 400 includes starting conditions where a first network is defined as well as a user record, and aggregate accounts on respective participants of a first network. Process flow 400 can be executed after an initial account creation for a respective user, among other options.

Process 400 begins at 402 with a request to transfer from an external source to a distributed target. For example, when in the DBS context a user may have opted to use distributed functionality, linking their accounts at the DBS to an integration system. The user may transfer any amount subject to the value in the user's account(s). Process 400 may optionally include an evaluation of the amount associated with the request to determine if distribution is required. For example, the request can be evaluated against federal regulation thresholds and if not exceeded the sweep system will be a sufficient participant in servicing the request. The following description presumes that the threshold value has been exceeded—250,000 per user per entity.

According to one embodiment, once an execution manager receives the request to transfer (e.g., via DBS integration), the execution manager can instruct a sweep system to complete the request based on determining a number of systems needed to service the request at 404. In various embodiments, the execution manager pings a transfer endpoint within a DBS API (e.g., which can be in turn connected to an entity's core software to enable transfers). The execution manager is configured to track the money movement from a DBS account (e.g., an external account) into a distributed operation account (e.g., an insured sweep program account). The initial distributed operation account can be maintained at the sweep system as an omnibus or aggregate account. The execution manager updates the sweep omnibus account ledger to record the new changes, both at the user level and for any aggregate effect on the omnibus account.

Typically, many users and many requests for distributed operation are being received and processed. In various embodiments, the execution manager uses the communication channel between the DBS and the integration system to provide real time updates on user level account information back to any information displays provided from the DBS (e.g., at 406). In various examples, the integration system can include or provide data access to user interface objects displayed in the DBS. The user interface objects are configured to display distributed information at an aggregate level and mimic non-distributed functions that users are familiar with in the context of their existing DBS. According to one example, users can initiate transfer operations having a distributed target without needing to appreciate or even consider the underlying distribution(s) associated with the target. Additionally, the user interface object enables access to the underlying distribution should a user elect to access that information.

According to one embodiment, once a transfer to the distributed operation target has been completed, process 400 continues at 408 with determination of a number of participant systems required to service the distributed operation. For example, the federal regulation threshold can be used to determine a number of participant systems required for a given amount associated with an initial request. In one example, step 408 can be executed by an execution manager to pull funds from the omnibus account and manage distribution (e.g., 410) to the remaining participant systems from the network. According to some embodiments, once a number of systems required is determined, the operations required to achieve the distribution are generated and executed at 410.

In various embodiments, the execution manager can interact with the one or more custodian system to execute the distribution (e.g., at 410). As the execution manager maintains the sweep omnibus account ledger and maintains the individual client records the execution manager can aggregate the distribution operations so that only the net change for a given time period must be executed within the network. Not shown in process 400, other distributed operations can be executed in conjunction with initial requests. Other users may be providing offsetting requests, or additional requests that would require transfer between members of the network.

In one embodiment, the execution manager is integrated with the one or more custodian systems, and via such integration (e.g., API, secure communication channel, etc.) triggers the one or more custodian systems to communicate a wire drawdown request to the sweeping system. Similarly, as part of a predefined first network the one or more custodian systems can be integrated with the one or more sweep systems and leverage their communication channels, among other options. The wire drawdown moves funds in a net amount that is aggregated across all individual users/accounts from the sweep omnibus account at the one or more sweep systems to an aggregate settlement account at the one or more custodian systems (e.g., at 412).

At 414, once the transfer has been executed at the one or more custodian systems, any transfers needed to be executed to receiver systems are completed. According to one embodiment, step 414 can be executed by an execution manager that employs its integration (secure communication channel) to the one or more custodian systems to trigger the custodian system to execute any transfers to needed receiver systems. As discussed, an execution manager system is configured to maintain the user-level ledger for specific users and the omnibus or aggregate ledgers for the network participants. Thus, the execution manager can aggregate a multitude of user level requests that span the members of the network, and reduce those individual requests into singular transfer executions at any sweep system, custodian system, and receiver systems. For example, the execution manager leverages its integration to instruct a respective custodian to initiate wires, which direct funds from the aggregate account at the custodian to receiving aggregate accounts at receiver systems. Whenever a user request is made, the execution manager is configured to update the respective ledgers (e.g., user level records and respective aggregate records, among other options).

Not shown in process 400, in various embodiments as updates are made in response to requests the execution manager can communicate the user-specific allocation back to the requesting user through their DBS. In some examples, the user can see the location/allocation of their deposits in real-time (even though in some aggregate operation scenarios an actual transfer may or may not have taken place, and in still others may not need to take place).

A process similar to process 400 can be executed in response to a request to return amounts to an external account (e.g., outside of the integration system and/or first network). For example, the execution manager can communicate wire drawdown requests to the receiver system(s) to pull money back to the custodian. The communication can be done using secure communication channels between the execution manager and the receiver system. For example, an API, web-interface, or other secure channel can be defined as part of building a first network configured to perform distributed operations. The execution manager can then initiate transfers from the custodian to transfer amounts to the sweep system and associated omnibus account. As with process 400, the transfer operations are net (aggregated across requests). In various embodiments, the integration system and/or execution manager is configured to perform the aggregated operations once a day, but other embodiments use different thresholds and include examples that do so more frequently.

Figure 5:
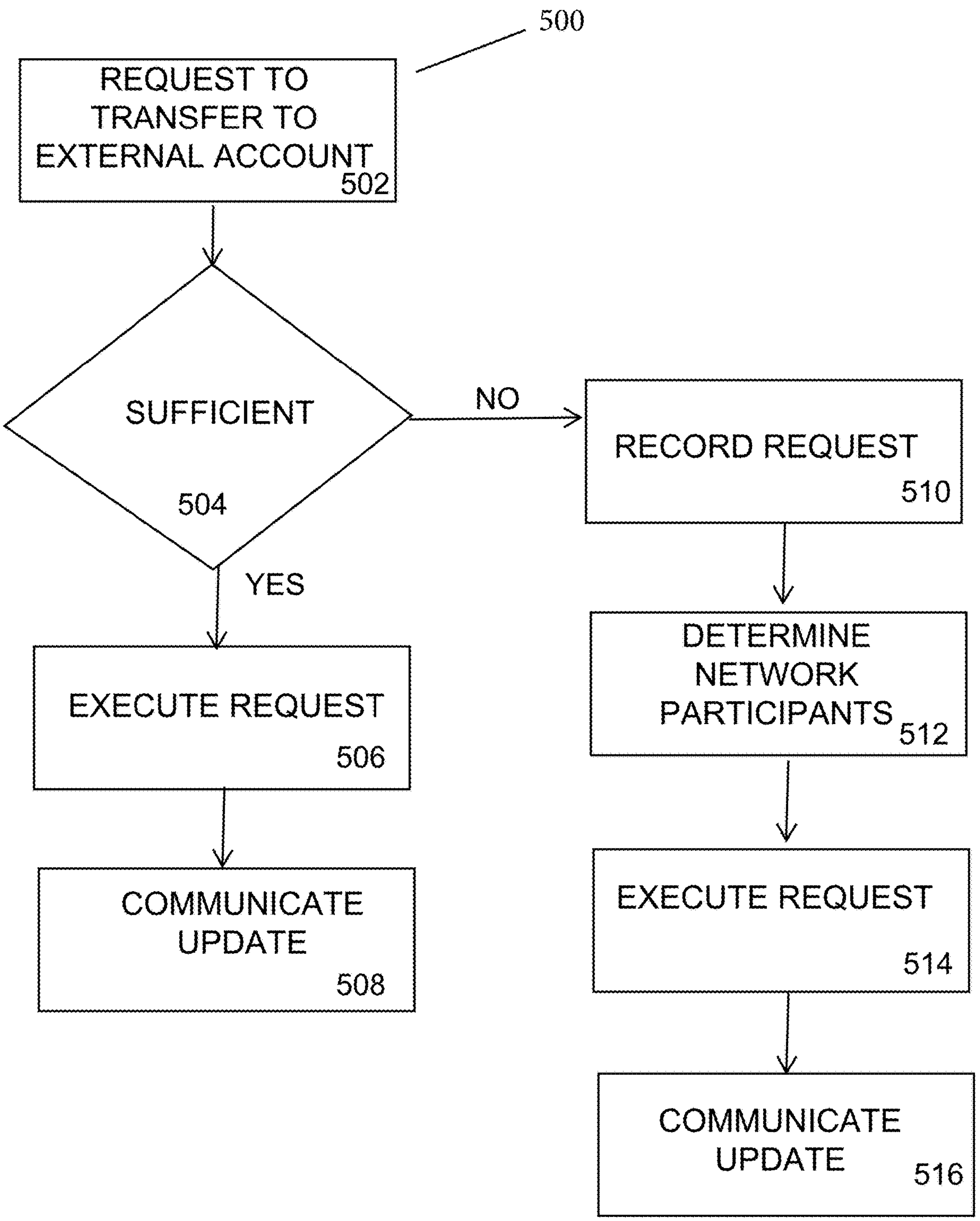
FIG. 5 is an example process flow, according to one embodiment.

FIG. 5 illustrates an example process 500 for returning amounts from an integration system/first network to an external account. For example, at 502 a user can request a transfer to their external accounts. At 504 YES, an evaluation can be made to determine if there are amounts sufficient within a sweep aggregate account to cover the transfer. According to one embodiment, step 504 can be executed by an execution manager, which has received the request via DBS integration, and can then instruct a sweep system to execute the request. In one example, the execution manager can communicate with a transfer endpoint within a digital banking API, which is in turn connected to the DBS/external system core software.

Upon execution of the request at 506, the change in amount is captured at the user level records as well as the net effect on the aggregation level ledgers. For example, the transfer from the sweep omnibus account into the user's external account is tracked and used to update individual level records held by the execution manager, and any net change on program omnibus account ledgers. The updates to the user level records can be communicated in real time at 508. For example, an execution manager can communicate the updates to a DBS and/or user interface object in real time. If there are not sufficient amounts at the sweep system 504 NO, the process can include execution of additional transfers from other network participants (e.g., custodian and/or receiver systems). At 510 the request is recorded; however, the execution is held in order to pull a total amount from the aggregate accounts held by the other network members-similar to process 400. At 512, a determination is made on where or what accounts to use to capture the additional amounts. For example, the determination can be optimized to limit the number of executions required—in other words, net movement is considered within the network so that aggregate requirements minimize any actual transfer between network members. In other examples, the determination can be optimized to eliminate the need for a network participant for a respective user. This determination can be made to limit the network resources required to service a particular user and improve system efficiency. The architecture and use of aggregate/omnibus accounts facilitates other optimizations. At 514, the optimized determination is used to execute the request, which can be communicated at 516.

According to one aspect, an integration system provides access to distributed operation and does so in a seamless fashion. The integration system enables an existing DBS to incorporate distributed functionality without changing the appearance or complexity of an existing interface. FIGS. 6-17 provide example screen captures of an interface and user interface objects that are associated with an integration system.

Figure 6:
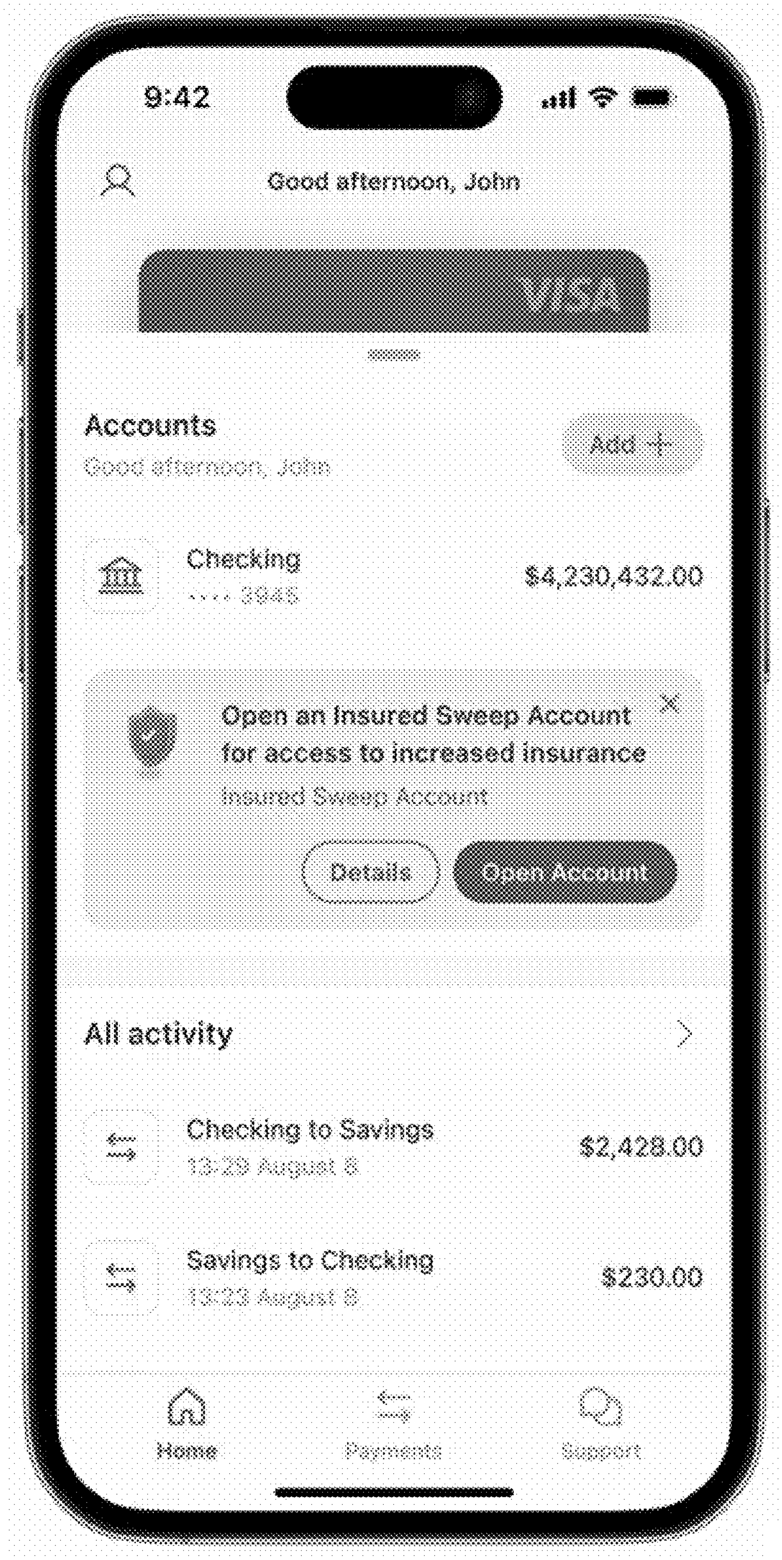
FIG. 6 is an example screen capture, according to one embodiment.
Figure 7:
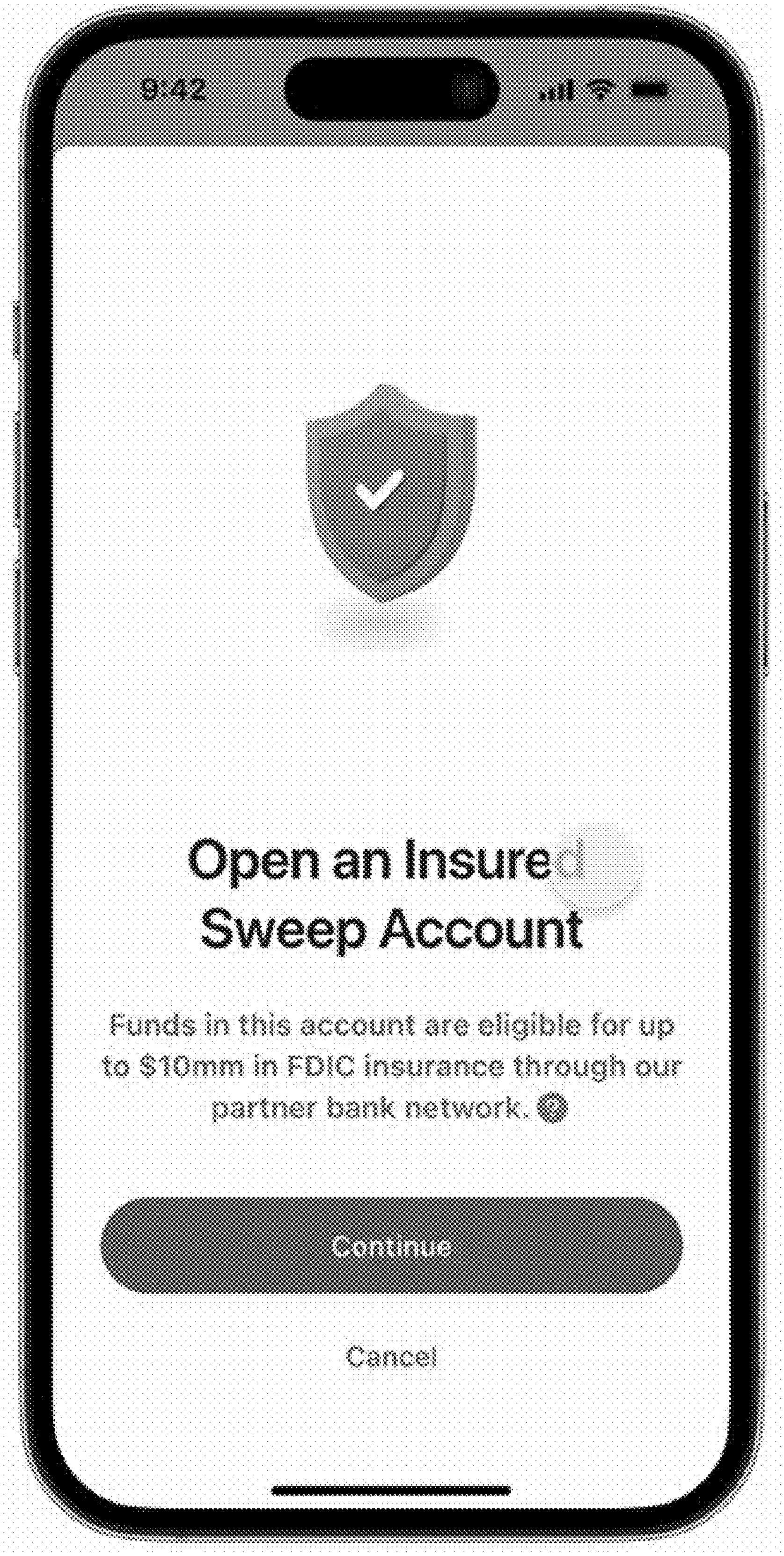
FIG. 7 is an example screen capture, according to one embodiment.
Figure 8:
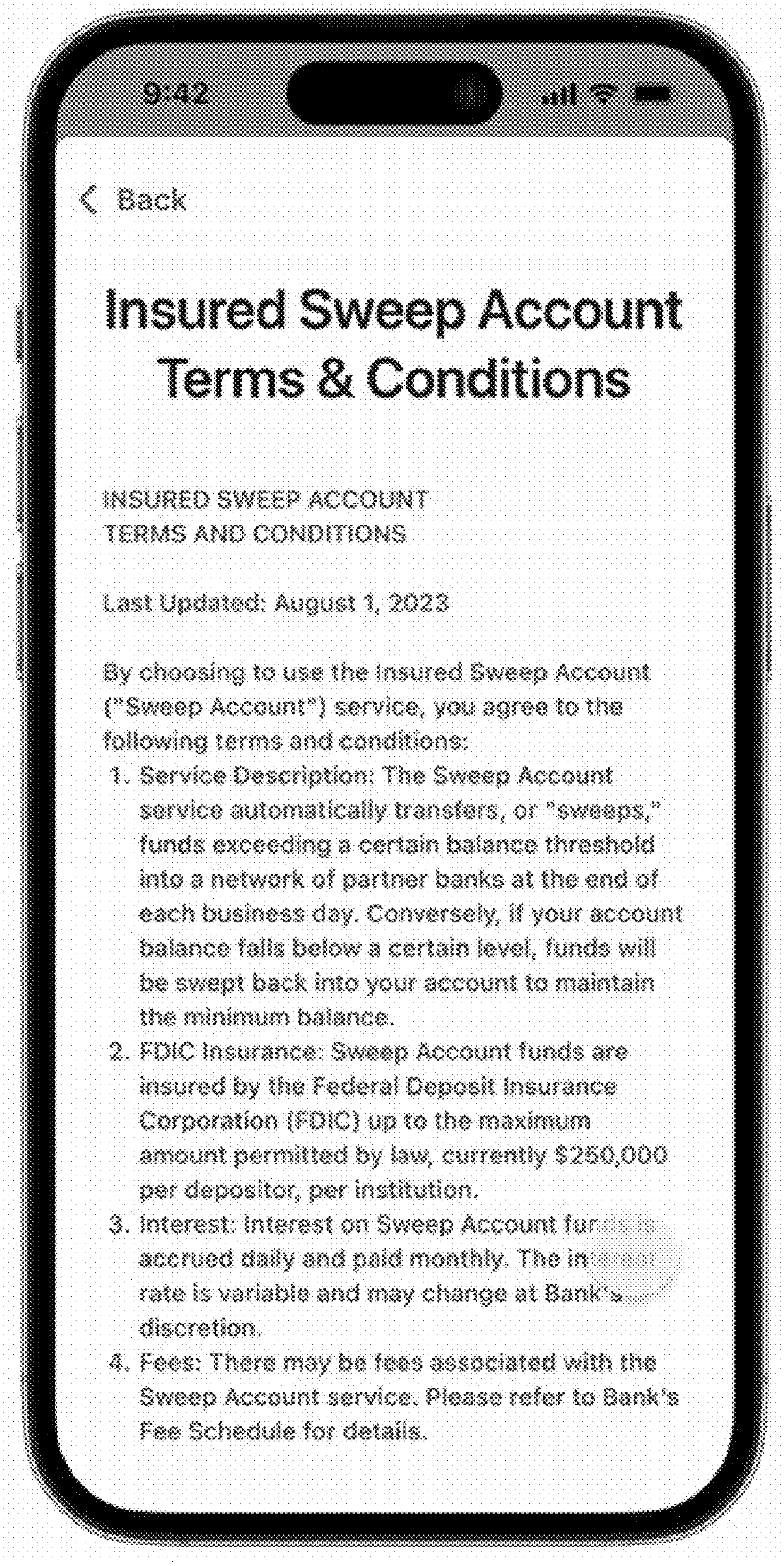
FIG. 8 is an example screen capture, according to one embodiment.
Figure 9:
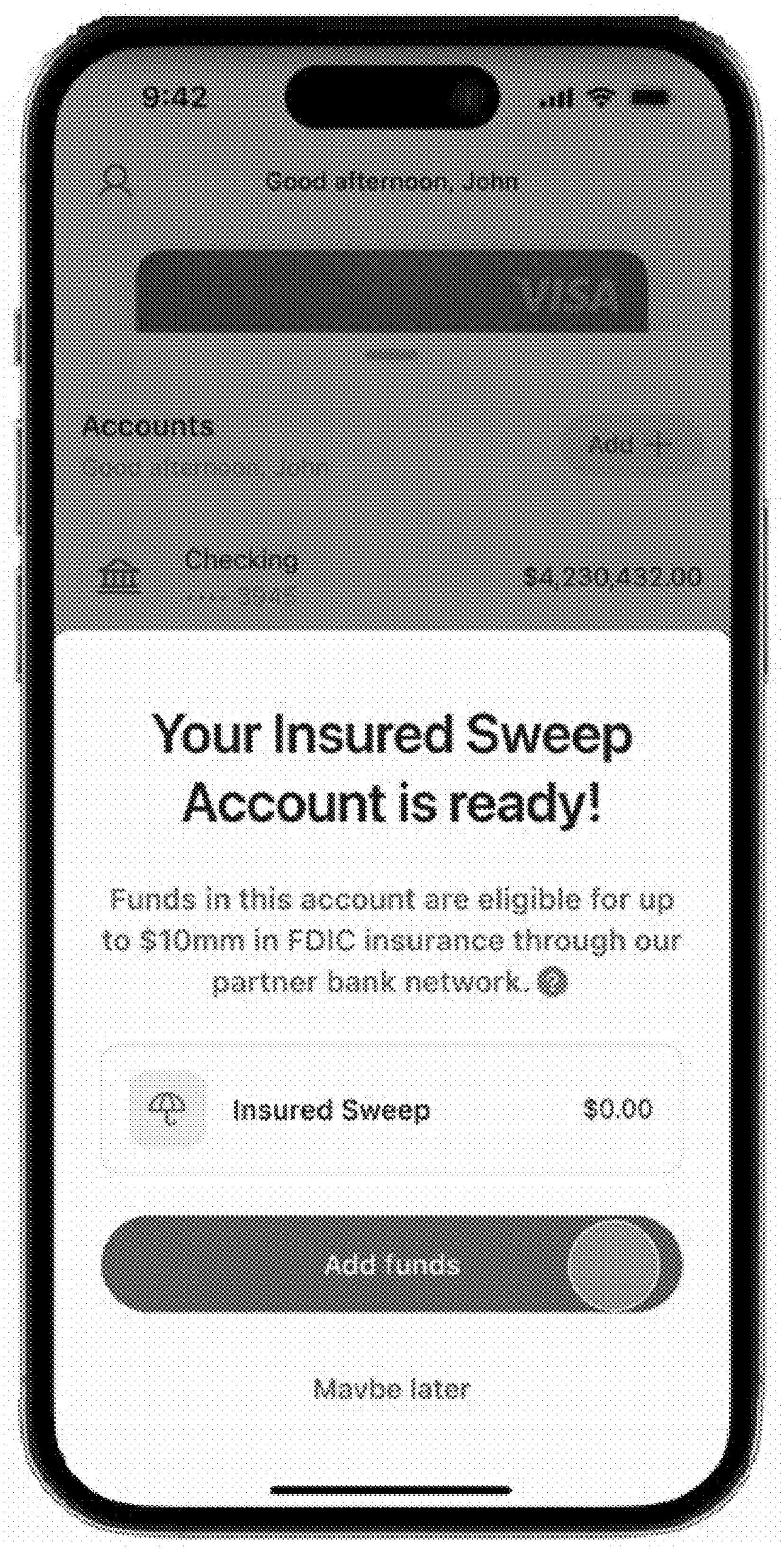
FIG. 9 is an example screen capture, according to one embodiment.
Figure 10:
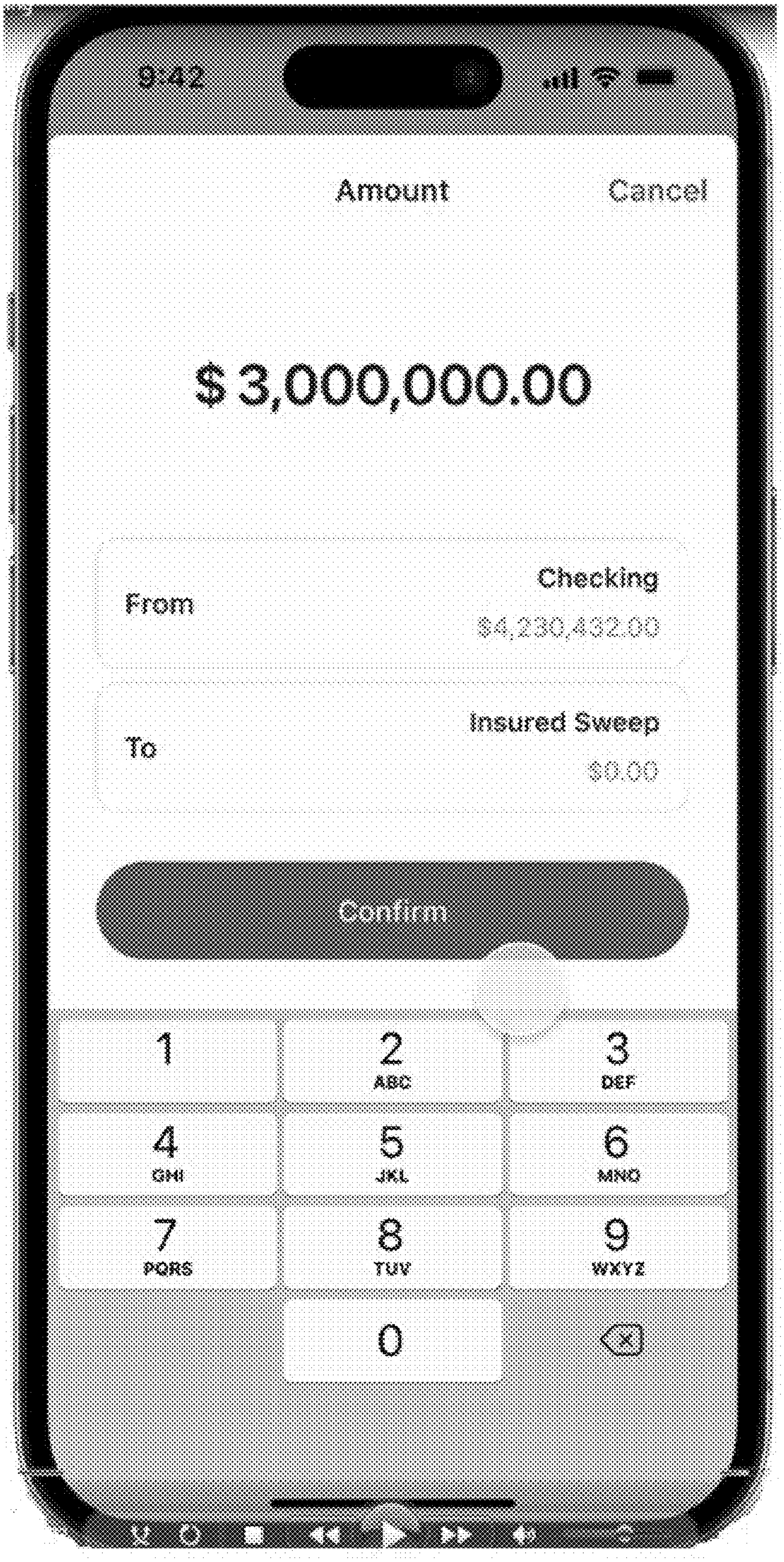
FIG. 10 is an example screen capture, according to one embodiment.

FIG. 6 is a screen capture of a user interface shown to an end user within the context of their DBS. As shown, a first interface object is displayed to enable users to add distributed operation functionality to their existing accounts. As shown, the interface provides the ability to integrate new functionality with simple selections in the UI. Upon selecting "open account" in the user interface the user is transitioned to a next screen to confirm the request (e.g., FIG. 7). Upon confirming the request, the user is shown a single set of terms (e.g., FIG. 8) and conditions that enable access to the integration system and its associated network of systems that support distributed operation. In some examples, the user interface can display a current status of the request and in little to no time can confirm that the new functionality is available to the user. FIG. 9 shows an example screen of a confirmation screen. According to some embodiments, the integration system has already set up the architecture required for distributed operation enabling the user request to be executed as a simple addition to already existing accounts (e.g., as a sub ledger record and an omnibus/aggregate account).

Figure 11:
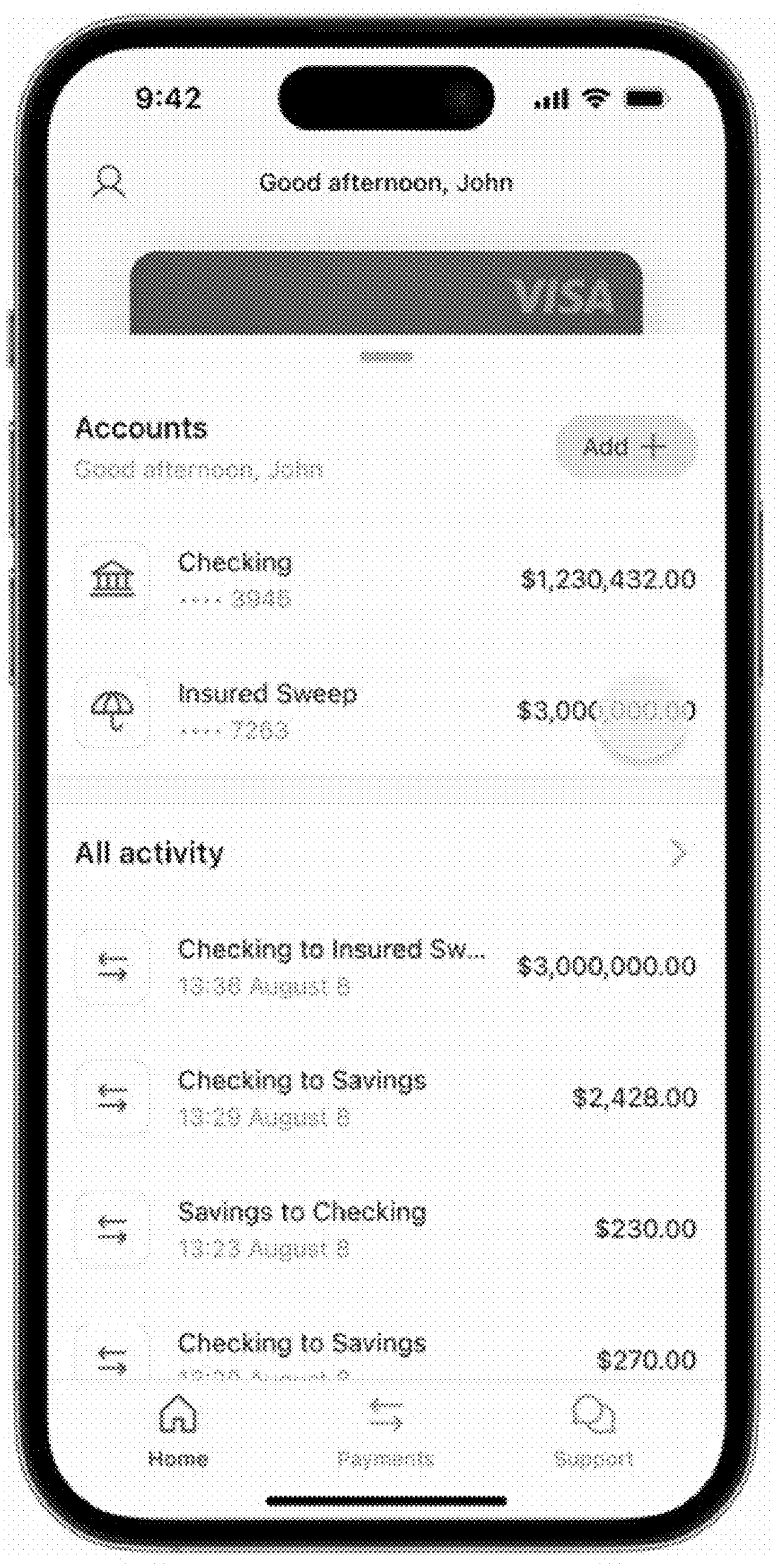
FIG. 11 is an example screen capture, according to one embodiment.
Figure 12:
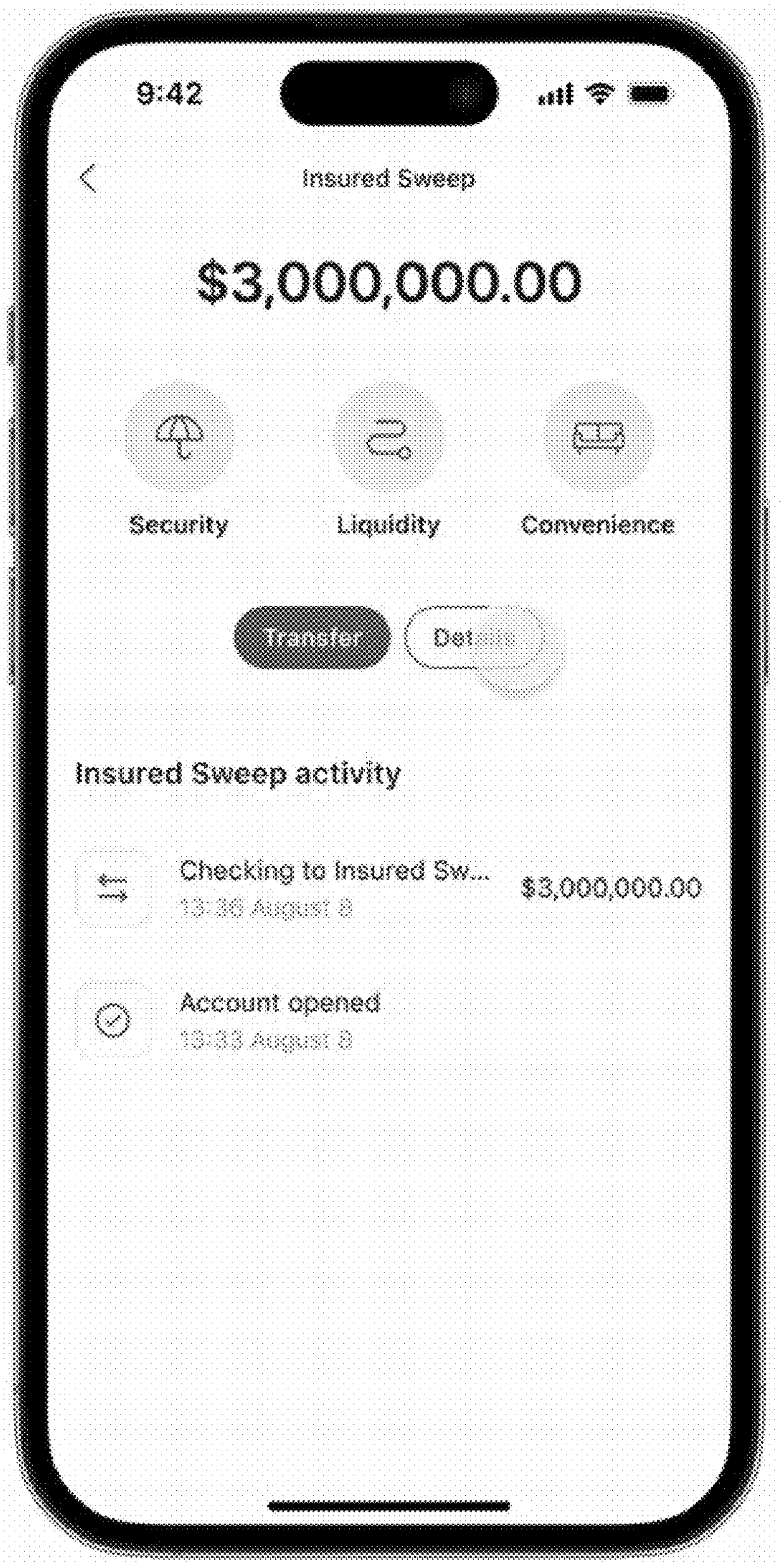
FIG. 12 is an example screen capture, according to one embodiment.
Figure 13:
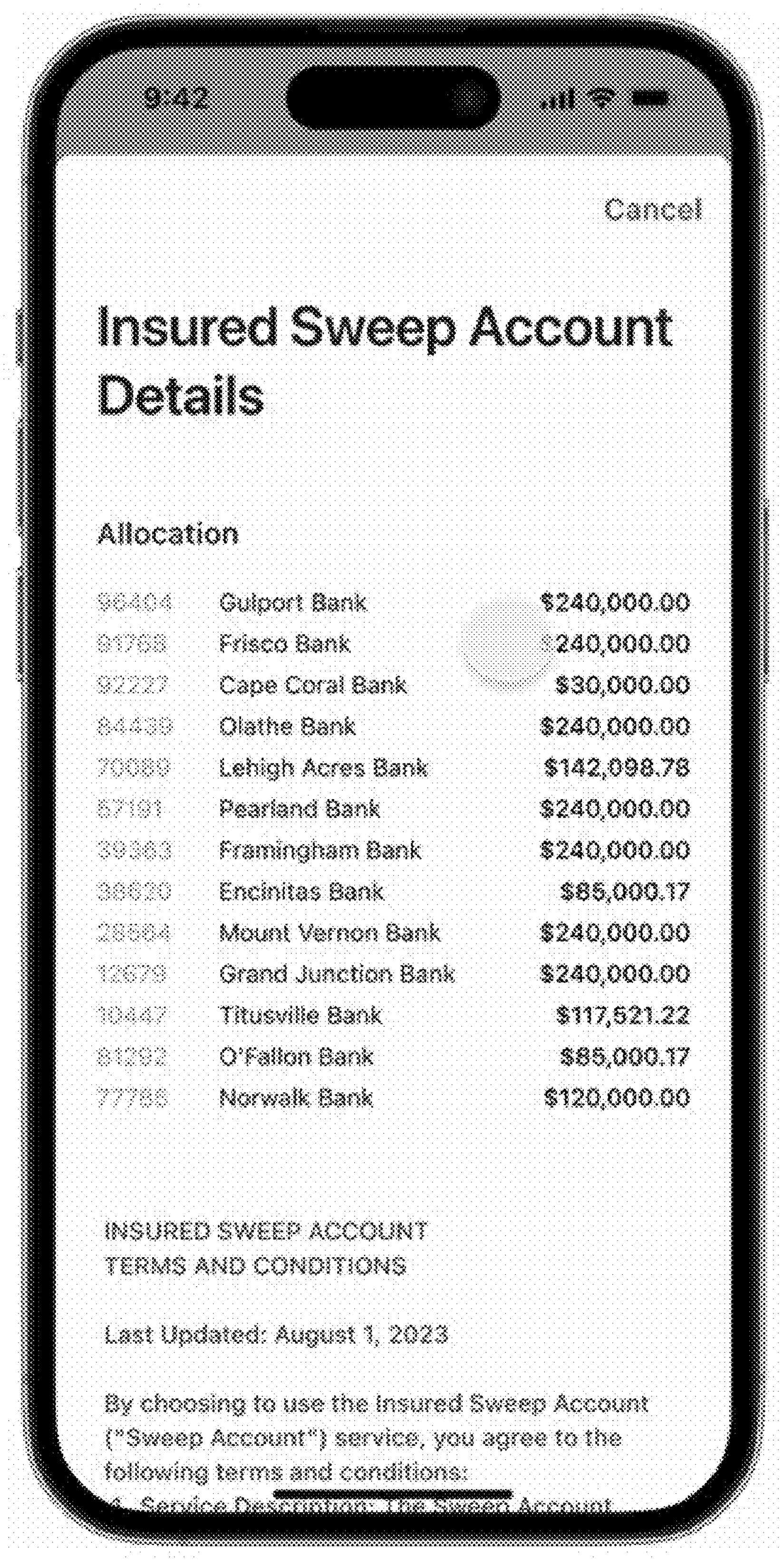
FIG. 13 is an example screen capture, according to one embodiment.

As shown in FIG. 9, the user can make simple selections in the user interface to add funds to the new account and associated distributed operation functionality. For example, in FIG. 10 the user can designate an amount to submit to the distributed operation control and via connection to, for example an integration system, the distributed operation is performed automatically. Shown in FIG. 11 is a display of current-account status as well as aggregate information associated with the new distributed operation account (e.g., "insured sweep"). The underlying details associated with and can also be accessed in the user interface for example by clicking on the user interface object associated with the insured sleep account. Shown in FIG. 11 is a circular indicator used as a pointer for selecting within the user interface. Upon clicking or activating the pointer the user interface transitions to the screen capture shown in FIG. 12. As shown in FIG. 12, a user can access additional details on their account or perform other operations. Upon selection of details the user interface transitions to FIG. 13. FIG. 13 provides a detailed breakdown of how the distributed operation was executed and the specific locations/participants from the integration system and/or first network.

Figure 14:
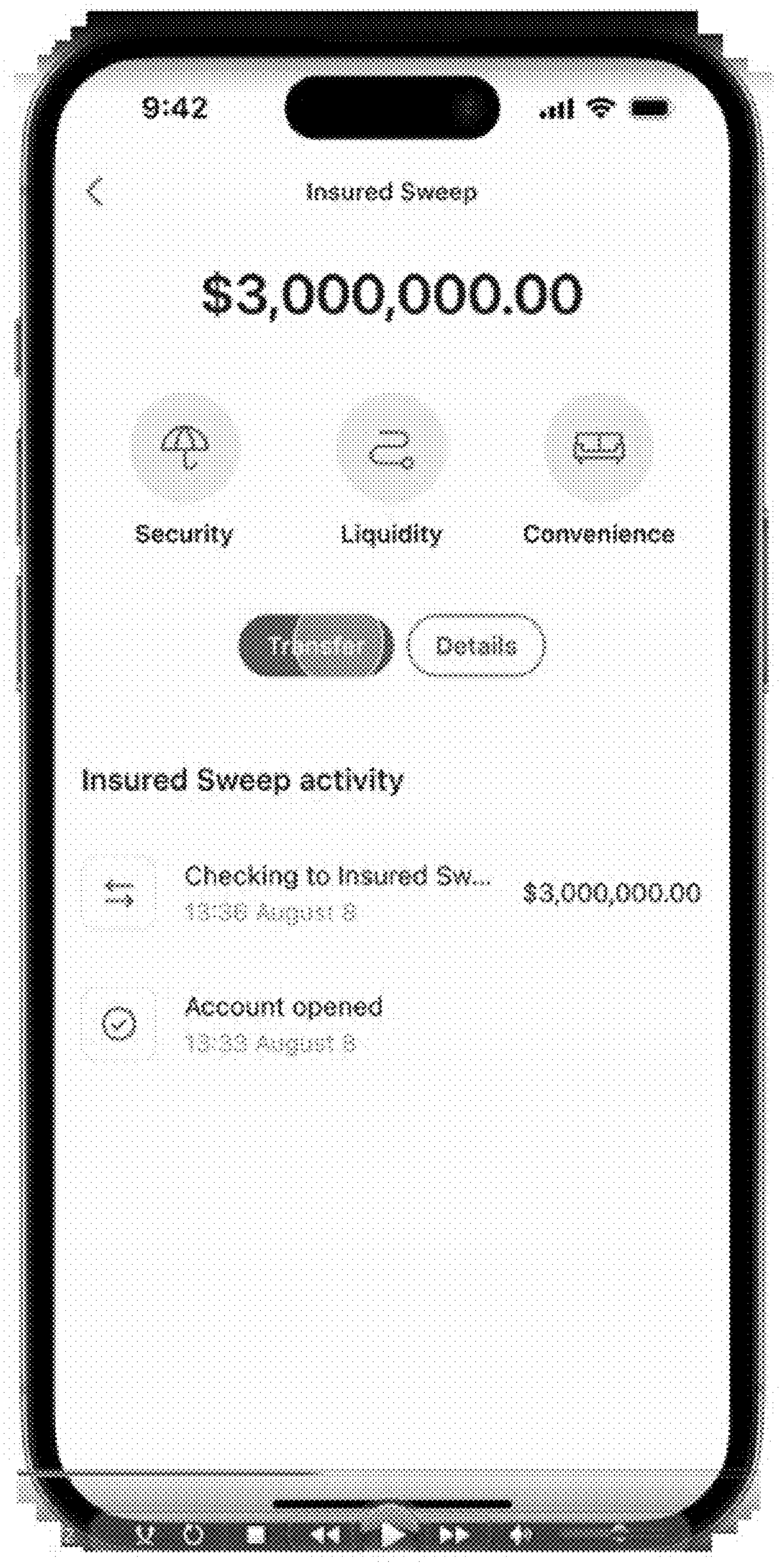
FIG. 14 is an example screen capture, according to one embodiment.
Figure 15:
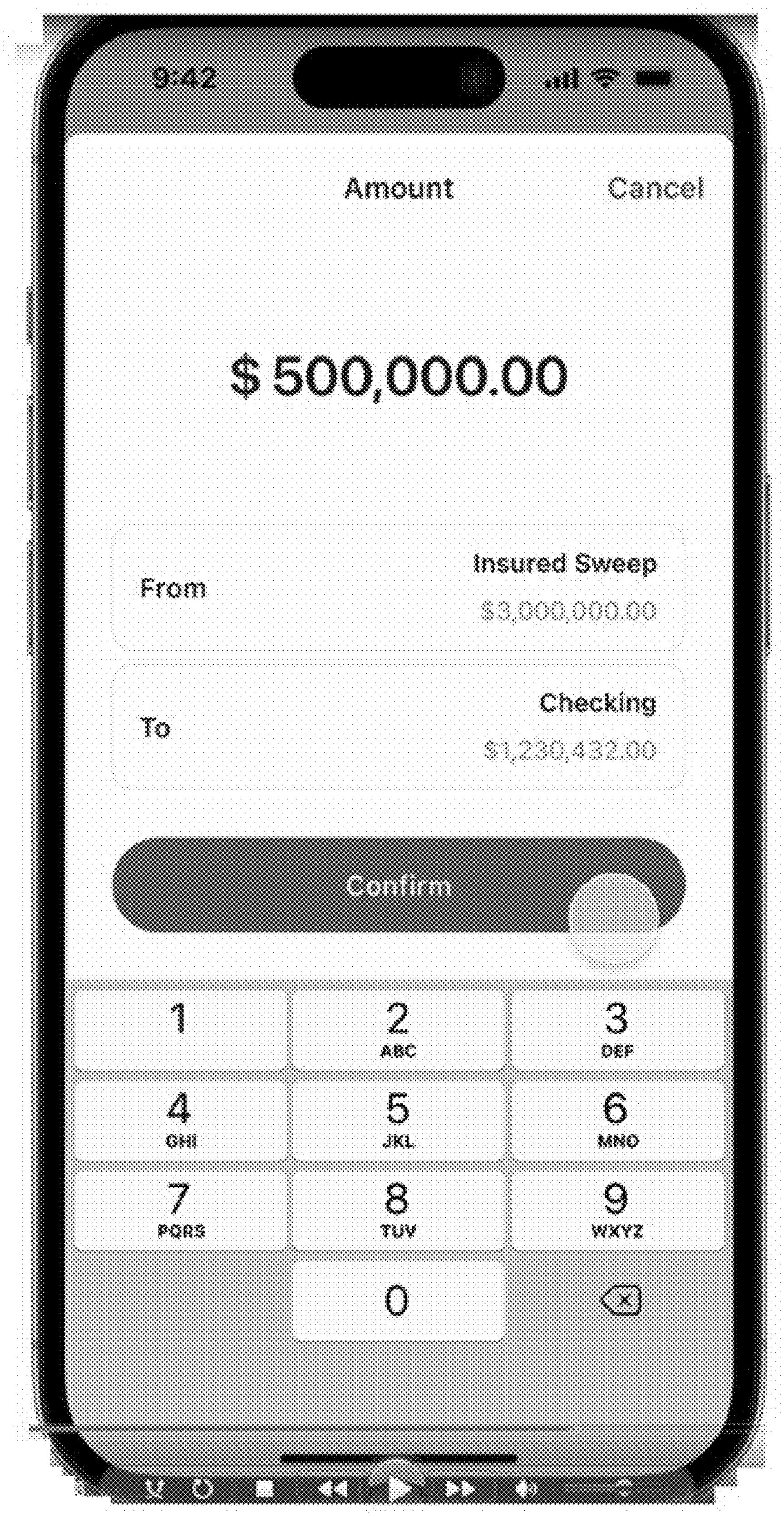
FIG. 15 is an example screen capture, according to one embodiment.
Figure 16:
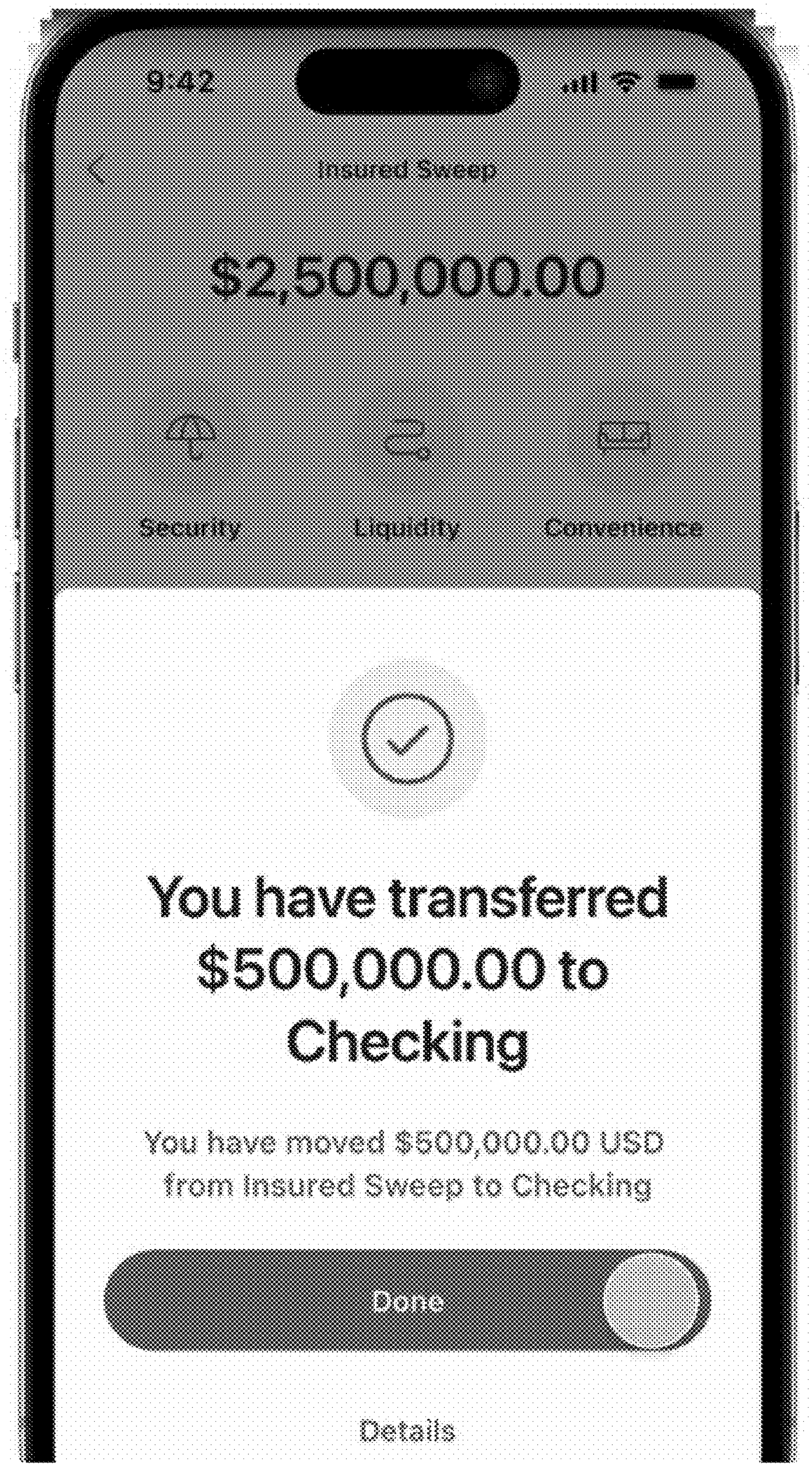
FIG. 16 is an example screen capture, according to one embodiment.
Figure 17:
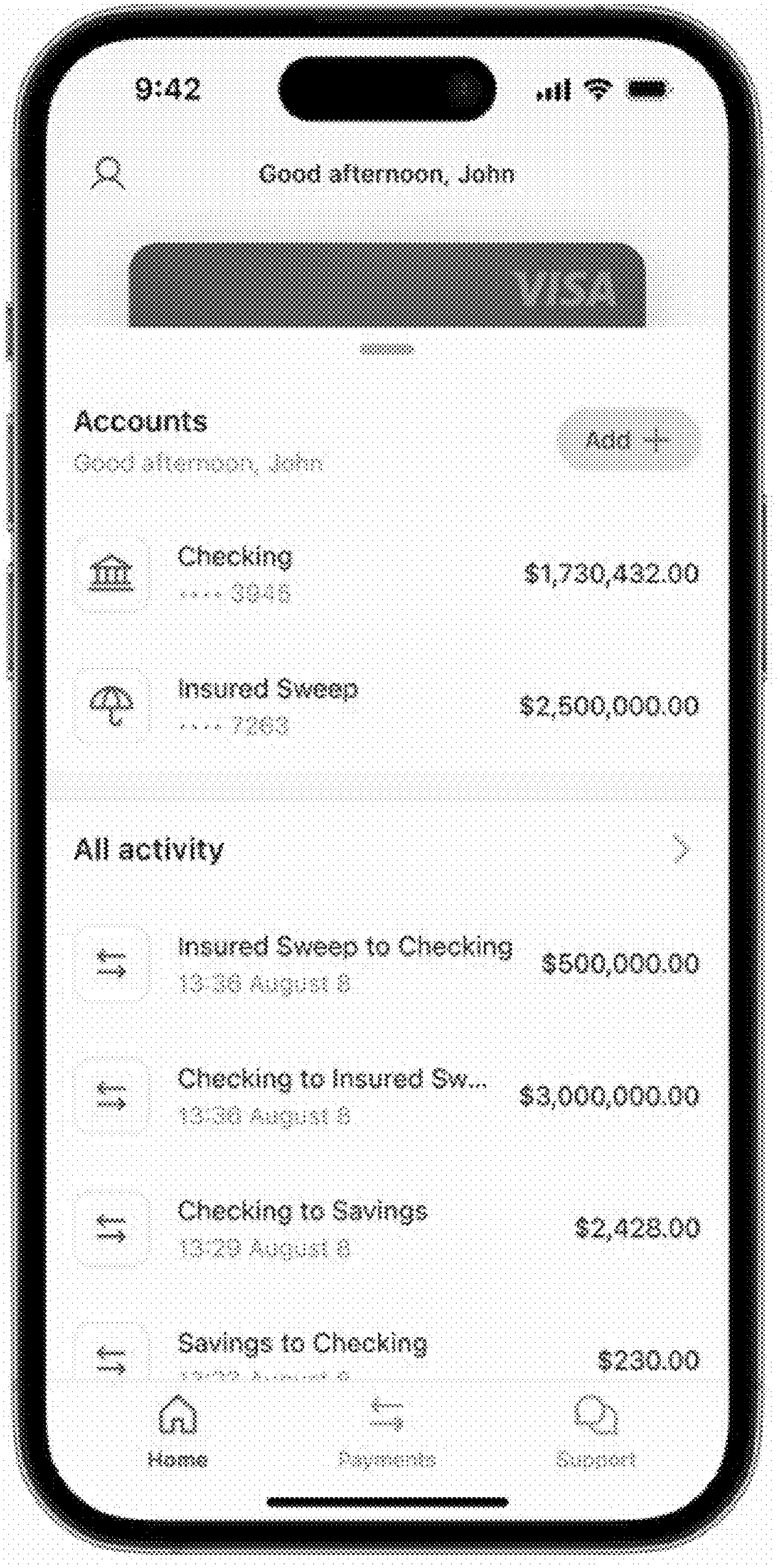
FIG. 17 is an example screen capture, according to one embodiment.

As discussed, the integration system and associated user interface objects provide seamless or frictionless access to distributed operation functionality. FIG. 14 is an example of the distributed operation functionality that can be accessed with simple selections in the user interface. For example, by selecting "transfer" in the user interface, a user may simply specify an amount and a destination (e.g., FIG. 15) to complete their operation, regardless of the sources or actual location systems from which the operation will take place. FIG. 16 provides an example screen capture confirming the execution of the operation and FIG. 17 provides current status information integrated into the context of the user's DBS using user interface objects associated with the integration system and user level ledgering.

According to another aspect, the user interface objects provide frictionless access to distributed operation functionality and enable the system to provide enhanced functions and improve execution efficiency of the supporting computer systems. According to one embodiment, the execution manager can aggregate individual user records into omnibus records held by participants selected from the first network members, where only a total aggregation record is required. In various embodiments, the individual underlying contributions or individual records can be maintained by the execution manager. In many settings, this makes the system more secure than conventional approaches, by limiting the individualized data to an execution manager, and having only aggregated information/records maintained at the respective participant systems. According to further embodiments, the architecture can also provide communication and computational efficiency over conventional implementation. For example, the execution manager can compile operations executed against individual client records into aggregated operations that accomplish the net result for all the clients over a defined time period (e.g., day, hours, etc.). In various conventional settings, each individual operation would be executed on respective records and systems. By aggregating the operations into a net change aggregate operations (e.g., wire draw downs and/or transfers) can be executed at each system holding an omnibus record, while individual level records are maintained at the execution manager. Thus, the system architecture eliminates communication of individual operations and the computational burden of executing the same, among other improvements.

In further embodiments, the supporting architecture (e.g., the first network) enables additional efficiencies in execution. For example, the architecture includes an execution manager configured to manage distribution of operation across members of the first network, allocation of system(s) to participate in the distributed operation(s), recording and tracking the results of the operations on the member systems. In the banking operation context, the execution manager is configured to track individual user records (e.g., depositor accounts), operation requests, and resulting amounts upon execution. The execution manager is also configured to allocate distributed operations between sweep systems, custodian systems, and receiver systems. According to one embodiment, the execution manager can aggregate individual user records into omnibus accounts held by participants from the first network members, where only a total amount is required. In various embodiments, the individual underlying contributions or individual records can be maintained by the execution manager. In many settings, this makes the system more secure than conventional approaches, by limiting the individualized data to an execution manager, and having aggregated information/records maintained as the respective participant systems. According to further embodiments, the architecture can also provide communication and computational efficiency over conventional implementation. For example, the execution manager can compile operations executed against individual client records into aggregated operations that accomplish the net result over a defined time period (e.g., day, hours, etc.). In various conventional settings, each individual operation would be executed on respective records and systems. By aggregating the operations into a net change aggregate operations (e.g., wire draw downs and/or transfers) can be executed at each system holding an omnibus record, while individual level records are maintained at the execution manager. Thus, the system architecture eliminates communication of individual operations and the computational burden of executing the same, among other improvements.

Figure 18:
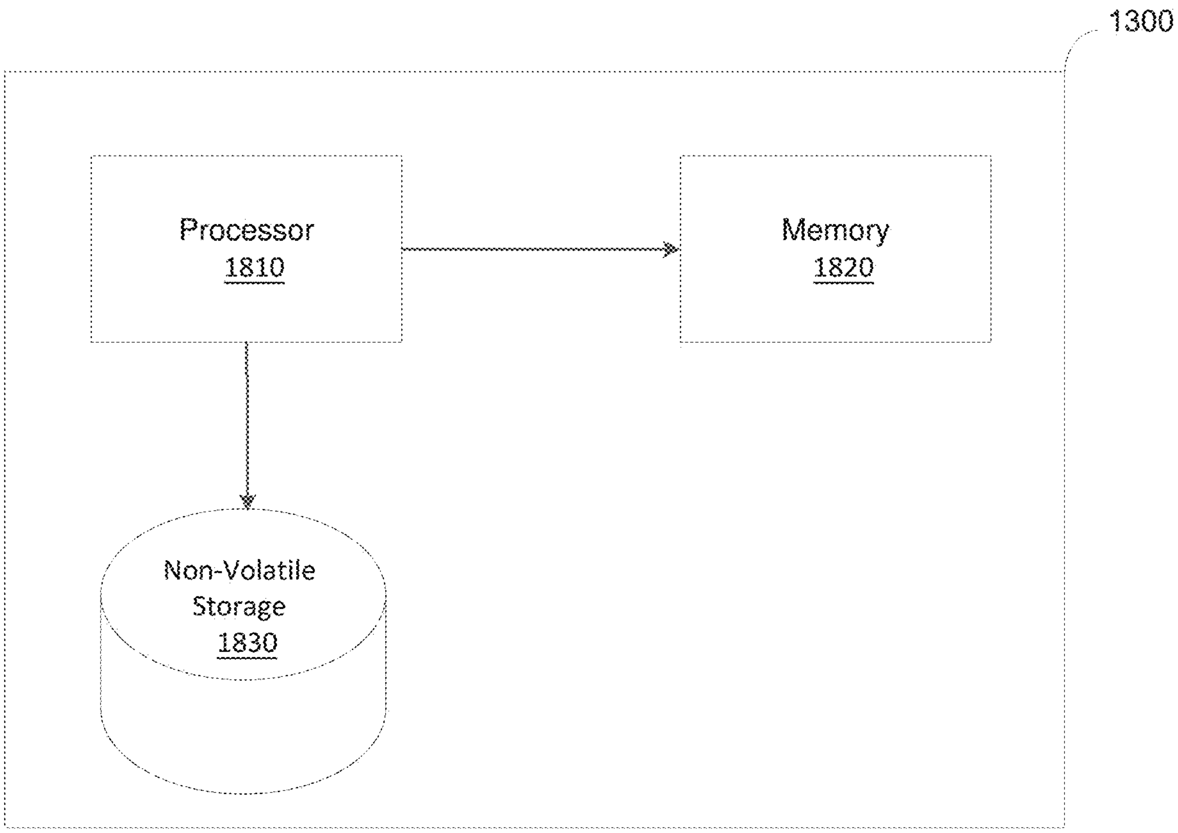
FIG. 18 is a block diagram of an example special purpose computer system improved by the functions and/or processes disclosed herein.

FIG. 18 is a block diagram of an example computer system that is improved by implementing the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 1800 that may be used in connection with any of the embodiments of the disclosure provided herein is shown in FIG. 18. The computer system 1800 may include one or more processors 1810 and one or more articles of manufacture that comprise non-transitory computer-readable storage media (e.g., memory 1820 and one or more non-volatile storage media 1830). The processor 1810 may control writing data to and reading data from the memory 1820 and the non-volatile storage device 1830 in any suitable manner. To perform any of the functionality described herein (e.g., image reconstruction, anomaly detection, etc.), the processor 1810 may execute one or more processor-executable instructions stored in one or more non-transitory computer-readable storage media (e.g., the memory 1820), which may serve as non-transitory computer-readable storage media storing processor-executable instructions for execution by the processor 1810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

In some examples operations can be considered as distributed when they are executed across a plurality of systems. Operations can also be considered distributed when they are executed across a plurality of systems and a plurality of entities that manage those systems. In some examples, additional security is realized by ensuring that distributed operations occur across multiple entities each having their own security implementation, authentication, etc. Various embodiments can add such entities and their systems in the distributed network, remove systems and/or entities (e.g., remove compromised entities/systems in real time), and move operations to new systems/entities that improve or have improved security relative to existing systems. Still other embodiments can be configured to select systems within the distributed network that improve performance of the network (e.g., with respect to processing capability, network considerations, etc.), among other options.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various ones of the functions and/or portions of the flow can be omitted, or consolidated. In yet other embodiments, various ones of the functions and/or portions of the flow can be combined, and used in various combinations of the disclosed flows, portions of flows, and/or individual functions. In various examples, various ones of the screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A distributed architecture system, comprising at least one processor operatively connected to a memory, the at least one processor when executing configured to:

define and manage a distributed architecture including an execution manager, the execution manager configured to:

accept respective requests comprising respective operations from a plurality of clients for transformation into respective distributed operations;

generate individual level records for respective ones of the plurality of clients in a first layer of data based on respective single operations; and generate aggregate client information across the plurality of clients in the first layer of data based on a net result of the respective single operations;

define and manage a second layer of data for the distributed architecture comprising a second aggregate record level associated with a custodian system configured to aggregate distribution of operations throughout the distributed architecture;

define and manage a third layer of data for the distributed architecture comprising a third aggregate record level associated with a plurality of receiver systems; and execute a distribution of individual level records across the distributed architecture according to a threshold holding level reflected in each data level and each participant of the distributed architecture.

2. The system of claim 1, wherein the at least one processor is configured to define and manage a fourth layer of data for the distributed architecture comprising a first aggregate record level associated with a sweep system.

3. The system of claim 2, wherein the sweep system is configured to accept initial transfers from external systems to start participation in distributed functionality.

4. The system of claim 1, wherein the execution manager is configured to accumulate the respective requests comprising the respective single operations from the plurality of clients over a first time period, and aggregate changes within respective data layers.

5. The system of claim 4, wherein the execution manager is configured to generate instructions to effect the aggregate changes within the respective data layers.

6. The system of claim 4, wherein the execution manager is configured to optimize execution of the distributed operation to minimize a number of operations required.

7. The system of claim 4, wherein the execution manager is configured to optimize execution of the distributed operation to minimize a number of systems required to execute the aggregate changes on the distributed architecture.

8. The system of claim 1, wherein the third layer of data for the distributed architecture comprising the third aggregate record level associated with the plurality of receiver systems includes a sweep system and the custodian system.

9. The system of claim 1, wherein the custodian system is configured to aggregate the distribution of operations throughout the distributed architecture in response to instruction received from the execution manager.

10. A computer implemented method comprising:

defining and managing, by at least one processor, a distributed architecture including defining an execution manager system;

accepting, by the at least one processor, respective requests comprising respective operations from a plurality of clients for transformation into respective distributed operations;

generating, by the at least one processor, individual level records for respective ones of the plurality of clients in a first layer of data based on the respective operations; and generating, by the at least one processor, aggregate data for client information across the plurality of clients in the first layer of data based on a net result of the respective operations;

defining and managing, by the at least one processor, a second layer of data for the distributed architecture comprising a second aggregate record level associated with a custodian system configured to aggregate distribution of operations throughout the distributed architecture;

defining and managing, by the at least one processor, a third layer of data for the distributed architecture comprising a third aggregate record level associated with a plurality of receiver systems; and executing, by the at least one processor, a distribution of individual level records across the distributed architecture according to a threshold holding level reflected in each data level and each participant of the distributed architecture.

11. The method of claim 10, wherein the method further comprises defining and managing a fourth layer of data for the distributed architecture comprising a first aggregate record level associated with a sweep system.

12. The method of claim 11, wherein the method further comprises accepting, by the at least one processor, initial transfers from external systems to start participation in distributed functionality.

13. The method of claim 10, wherein the method further comprises accumulating, by the at least one processor, the respective requests comprising respective operations from the plurality of clients over a first time period, and aggregating changes within respective data layers.

14. The method of claim 13, wherein the method further comprises generating, by the at least one processor, instructions to effect the aggregate changes within the respective data layers.

15. The method of claim 13, wherein the method further comprises optimizing, by the at least one processor, execution of the distributed operation to minimize a number of operations required.

16. The method of claim 13, wherein the method further comprises optimizing, by the at least one processor, execution of the distributed operation to minimize a number of systems required to execute the aggregate changes on the distributed architecture.

17. The method of claim 10, wherein the method further comprises defining the third layer of data for the distributed architecture comprising the third aggregate record level associated with the plurality of receiver systems to include a sweep system and the custodian system.

18. The method of claim 10, wherein the method further comprises aggregating the distribution of operations throughout the distributed architecture in response to instruction received from the execution manager.

19. A non-transitory computer readable medium comprising instructions that when executed cause at least one processor to perform a method, the method comprising:

defining and managing a distributed architecture including defining an execution manager system;

accepting respective requests comprising respective operations from a plurality of clients for transformation into respective distributed operations;

generating individual level records for respective ones of the plurality of clients in a first layer of data based on the respective operations; and generating aggregate data for client information across the plurality of clients in the first layer of data based on a net result of the respective operations;

defining and managing a second layer of data for the distributed architecture comprising a second aggregate record level associated with a custodian system configured to aggregate distribution of operations throughout the distributed architecture;

defining and managing a third layer of data for the distributed architecture comprising a third aggregate record level associated with a plurality of receiver systems; and executing a distribution of individual level records across the distributed architecture according to a threshold holding level reflected in each data level and each participant of the distributed architecture.

20. The computer readable medium of claim 19, wherein the method further comprises defining and managing a fourth layer of data for the distributed architecture comprising a first aggregate record level associated with a sweep system.

* * * * *